(12) United States Patent  (10) Patent No.: US 9,262,734 B2
Augenstein et al.  (45) Date of Patent: *Feb. 16, 2016

(54) SATELLITE SCHEDULING SYSTEM

(71) Applicant: Skybox Imaging, Inc., Mountain View, CA (US)

(72) Inventors: Sean Augenstein, Palo Alto, CA (US); Julian M. Mann, Menlo Park, CA (US); Daniel Berkenstock, Menlo Park, CA (US)

(73) Assignee: Skybox Imaging, Inc., Mountain View, CA (US)

( * ) Notice: Subject to any disclaimer, the term of this patent is extended or adjusted under 35 U.S.C. 154(b) by 277 days.

This patent is subject to a terminal disclaimer.

(21) Appl. No.: 13/958,433

(22) Filed: Aug. 2, 2013

(65) Prior Publication Data

US 2014/0039963 A1  Feb. 6, 2014

Related U.S. Application Data

(60) Provisional application No. 61/679,581, filed on Aug. 3, 2012, provisional application No. 61/682,047, filed on Aug. 10, 2012.

(51) Int. Cl.
*B64G 1/36* (2006.01)
*G06Q 10/06* (2012.01)
(Continued)

(52) U.S. Cl.
CPC ........ *G06Q 10/06314* (2013.01); *B64G 1/1021* (2013.01); *B64G 1/1085* (2013.01);
(Continued)

(58) Field of Classification Search
CPC ................... G06Q 10/06314; G06F 17/30241; B64G 1/1021; B64G 1/1085; B64G 1/242; Y10S 707/921; Y10S 707/919

USPC ................ 707/736, 748, 919, 921; 705/7.24; 701/13

See application file for complete search history.

(56) References Cited

U.S. PATENT DOCUMENTS 5,911,389 A  6/1999  Drake
5,987,363 A  11/1999  Quan et al.
(Continued)

FOREIGN PATENT DOCUMENTS

CN  102322850  1/2012
CN  10254288  2/2012
(Continued)

OTHER PUBLICATIONS

PCT Search Report and Written Opinion in corresponding International Application No. PCT/US2013/053492, mailed May 21, 2014, 18 pages.

(Continued)

*Primary Examiner* — Gertrude Arthur Jeanglaude
(74) *Attorney, Agent, or Firm* — Dority & Manning, P.A.

(57) ABSTRACT

Systems and methods are provided for scheduling objects having pair-wise and cumulative constraints. The systems and methods presented can utilize a directed acyclic graph to increase or maximize a utilization function. Violation of cumulative constraints can be identified at the moment of constraint violation such that events resulting in constraint violations can be removed from the schedule while the schedule is being determined. By removing the events triggering constraint violations at the point of constraint violation, the systems and methods provided can determine optimal or near-optimal schedules in a relatively quick and efficient manner compared to systems and methods that check for violations of cumulative constraints after determining a schedule. The objects can comprise satellites in a constellation of satellites. In some implementations, the satellites are imaging satellites, and the systems and methods for scheduling can use crowd-sourced data to determine events of interest for acquisition of images.

23 Claims, 11 Drawing Sheets

(51) Int. Cl.
*G06F 17/30* (2006.01)
*B64G 1/10* (2006.01)
*B64G 1/24* (2006.01)

(52) U.S. Cl.
CPC .......... *G06F17/30241* (2013.01); *B64G 1/242* (2013.01); *Y10S 707/919* (2013.01); *Y10S 707/921* (2013.01)

(56) References Cited

U.S. PATENT DOCUMENTS

| | | | |
|---|---|---|---|
| 6,241,192 | B1 | 6/2001 | Kondo |
| 6,491,257 | B1 | 12/2002 | Emmons, Jr. et al. |
| 6,502,790 | B1 | 1/2003 | Murphy |
| 6,606,529 | B1 | 8/2003 | Crowder, Jr. et al. |
| 7,002,918 | B1 | 2/2006 | Prieto, Jr. et al. |
| 7,542,829 | B2 | 6/2009 | Lee et al. |
| 8,997,619 | B2 * | 4/2015 | Sasaki et al. .................... 83/879 |
| 2003/0095181 | A1 | 5/2003 | LeCompte |
| 2004/0158832 | A1 * | 8/2004 | Chechik et al. ............... 718/102 |
| 2010/0119053 | A1 | 5/2010 | Goeldi |
| 2010/0311417 | A1 | 12/2010 | Korb et al. |
| 2011/0115793 | A1 | 5/2011 | Grycewicz |
| 2011/0188548 | A1 | 8/2011 | Antikidis |
| 2012/0029812 | A1 | 2/2012 | Altwaijry et al. |
| 2012/0036085 | A1 | 2/2012 | Srivastava et al. |
| 2012/0155329 | A1 | 6/2012 | Shaffer et al. |
| 2012/0254887 | A1 | 10/2012 | Rodriguez |
| 2013/0086072 | A1 | 4/2013 | Peng et al. |
| 2013/0124079 | A1 | 5/2013 | Olivier et al. |
| 2013/0275036 | A1 | 10/2013 | Olivier et al. |
| 2014/0027576 | A1 | 1/2014 | Boshuizen et al. |
| 2014/0039963 | A1 | 2/2014 | Augenstein et al. |
| 2014/0040282 | A1 | 2/2014 | Mann et al. |

FOREIGN PATENT DOCUMENTS

| | | |
|---|---|---|
| CN | 102867107 | 2/2012 |
| CN | 103336715 | 10/2013 |
| EP | 0 992 429 | 4/2000 |
| EP | 2 664 989 | 11/2013 |
| EP | 2664989 | 11/2013 |
| WO | WO 97/26187 | 7/1997 |
| WO | WO 2004/048197 | 6/2004 |
| WO | WO 2004/048197 A1 | 6/2004 |
| WO | WO 2011/089477 | 7/2011 |
| WO | WO 2011/089477 A1 | 7/2011 |
| WO | WO 2014/022810 | 2/2014 |

OTHER PUBLICATIONS

Directed Acyclic Graph, http://en.wikipedia.org/wiki/Directed_acyclic_graph, Retrieval Date Aug. 7, 2014—5 pages.
R. Bellman, "On a Routing Problem," Notes, vol. XVI, No. 1, 1956, pp. 87-90.
J.R. Bogosian, "Image Collection Optimization in the Design and Operation of Lightweight, Low Areal-Density Space Telescopes," Master's Thesis, Massachusetts Institute of Technology, May 23, 2008, pp. 1-155.
E.W. Dijkstra, "A Note on Two Problems in Connexion with Graphs," Numerische Mathematic, vol. 1(1), Jun. 1959, pp. 269-271.
L.R. Ford et al., "Flows in Networks," The Rand Corporation, Aug. 1962.
V. Gabrel, "Strengthened 0-1 linear formulation for the daily satellite Mission Planning," Journal of Combinatorial Optimization, vol. 1(3), Jan. 11, 2006, pp. 341-346.
V. Gabrel et al., "A New Single Model and Derived Algorithms for the Satellite Shot Planning Problem Using Graph Theory Concepts," Annals of Operation Research, vol. 69, 1997, pp. 115-134.
V. Gabrel et al., "Enumeration and Interactive Selection of Efficient Paths in a Multiple Criteria Graph for Scheduling an Earth Observing Satellite," European Journal of Operational Research, vol. 139(3), 2002, pp. 533-542.

V. Gabrel et al., "Mathematical Programming for Earth Observation Satellite Mission Planning," Chapter 7, Operations Research in Space and Air, 2003, pp. 103-122.
S.A. Harrison et al., "Task Scheduling for Satellite Based Imagery," In Proceedings of the Eighteenth Workshop of the UK Planning and Scheduling Special Interest Group, vol. 78, University of Salford, UK, Dec. 1999.
M. Lemaitre et al., "Selecting and Scheduling Observations of Agile Satellites," Aerospace Science and Technology, vol. 6(5), Jul. 1, 2002, pp. 367-381.
Beaumet, G. et al., "Decision-Making on-boad an Autonomous Agile Earth-Observing Satellite", International Converence on Automated Planning and Scheduling, ICAPS '08, Sep. 17, 2008 in 7 pages.
Invitation to Pay Additional Fees in corresponding International Application No. PCT/US2013/053492, Feb. 18,2014, 8 pages.
Bataille, "Efficiency and Fairness When Sharing the Use of a Satellite", Proceedings of Fifth International Symposium on Artificial Intelligence, Robotics, and Automation in Space, Noordwijk, the Netherlands, Jun. 1-3, 1999, pp. 465-470.
Beaumet et al., "Decision-Making On-Board an Autonomous Agile Earth-observing Satellite", The International Conference on Automated Planning and Scheduling, Sydney, Australia, Sep. 17, 2008—7 pages.
Bellman, "On a Routing Problem", Notes, vol. XIV, No. 1, 1956, pp, 87-90.
Bensana, "Testing Spacecraft Autonomy with AGATA", Proceedings the 9th International Symposium on Artificial Intelligence, Robotics, and Automation for Space, Los Angeles, California, Feb. 25-29, 2008—9 pages.
Bogosian, "Image Collection Optimization in the Design and Operation of Lightweight, Low Areal-Density Space Telescopes", Master's Thesis, Massachusetts Institute of Technology, May 23, 2008, 155 pages.
Bouveret et al., "New Constraint Programming Approaches for the Computation of Leximin-Optimal Solutions in Constraint Networks"; Proceedings of the 20th International Joint Conference on Artificial Intelligence, Hyderbad, India, Jan. 12, 2007, pp. 62-67.
Chevaleyre et al., "Issues in Multiagent Resource Allocation", Informatica, vol. 30, No. 1, 2006, pp. 331.
Dijkstra, "A Note on Two Problems in Connexion with Graphs", Numerische Mathematik, vol. 1, Jun. 1959, pp. 269-271.
Endriss et al., "Proceedings of the $1_{st}$ International Workshop on Computational Social Choice", University of Amsterdam, Dec. 2006, 519 pages.
Ford et al., "Flows in Network", The Rand Corporation, Aug. 1962—332 pages.
Gabrel et al., "Enumeration and Interactive Selection of Efficient Paths in a Multiple Criteria Graph for Scheduling an Earth Observing Satellite", European Journal of Operational Research, vol. 139, Issue 3, 2002, pp. 533-542.
Gabrel et al., "Mathematical Programming for Earth Observation Satellite Mission Planning", Chapter 7, Operations Research in Space and Air, 2003, pp. 103-122.
Gabrel, "Strengthened 0-1 Linear Formulation for the Daily Satellite Mission Planning", Journal of Combinatorial Optimization, vol. 1, Issue 3, Jan. 11, 2006, pp. 341-346.
Harrison et al., "Task Scheduling for Satellite Based Imagery", In Proceedings of the 18th Workshop of the UK Planning and Scheduling Special Interest Group, vol. 78, University of Salford, UK, Dec. 15-16, 1999—15 pages.
Lemaitre et al., "How to Manage the New Generation of Agile Earth Observation Satellites?", International Conference on Space Operations, Toulouse, France, Jun. 2000—9 pages.
Lemaitre. et al., "Selecting and Scheduling Observations of Agile Satellites", Aerospace Science and Technology, vol. 6, No. 5, Jul. 1, 2002, pp. 367-381.

(56) References Cited

OTHER PUBLICATIONS

Lemaitre et al., "Sharing the Use of Earth Observation Satellites", Proceedings of the 3rd NASA International Workshop on Planning and Scheduling for Space, Houston, Texas, Oct. 27-29, 2002—5 pages.

Lemaitre et al., "Towards the Formal Verification of the Functional Architecture of Autonomous Satellite Onboard Flight Software", $3^{rd}$ National Conference on Control Architectures of Robots, Bourges, May 29-30, 2008, 8 pages.

Pralet et al., "Controller Synthesis for Autonomous Systems: A Constraint Base Approach", $10^{th}$ International Symposium on Artificial Intelligence, Robotics and Automation in Space, Saporo, Japan, Aug. 29-Sep. 1, 2010,—8 pages.

Verfaillie et al., "How to Model Planning and Scheduling Problems Using Constraint Networks on Timelines", The Knowledge Engineering Review, vol. 25, Special Issue 3, Sep. 2010, pp. 319-336.

Lemaitre et al., "Selecting and scheduling observations of agile satellites," Aerospace Science and Technology, pp. 367-381, Jul. 1, 2002, Elsevier SAS.†

\* cited by examiner

† cited by third party

SATELLITE SCHEDULING SYSTEM

CROSS-REFERENCE TO RELATED APPLICATIONS

This application claims the benefit of priority under 35 U.S.C. §119(e) to U.S. Provisional Patent Application No. 61/679,581, filed Aug. 3, 2012, entitled "Overhead Image Acquisition Scheduling System Using Crowd-Sourced Data", and to U.S. Provisional Patent Application No. 61/682,047, filed Aug. 10, 2012, entitled "Scheduling System". Each of the foregoing applications is expressly incorporated by reference herein in its entirety so as to form part of this specification.

BACKGROUND

Scheduling problems appear in many applications such as satellite scheduling, airline crew scheduling, vehicle routing, traveling salesmen problems, and the like. Applications such as these involve allocating resources to activities over time. Typically, resources are scarce and constrained in various ways, e.g., in the capacity of resources and/or the order of activities. Solving a typical scheduling problem can involve creating a schedule of activities that satisfies the constraints and is optimal according to some criterion. Implementing a schedule can include finding a desirable solution to a scheduling problem accounting for various constraints, communicating the desirable solution to the appropriate people or systems, and executing the schedule as communicated.

SUMMARY

The systems, methods and devices described herein have innovative aspects, no single one of which is indispensable or solely responsible for their desirable attributes. Without limiting the scope of the claims, some of the advantageous features will now be summarized.

One goal in managing a network of imaging satellites is to quickly respond to image acquisition requests. Requests for images can change rapidly and it would be advantageous to update schedules of events on each satellite in near real-time to reduce or eliminate missed opportunities for acquiring timely imagery or performing other time-sensitive tasks.

Another goal is to efficiently utilize the resources of the imaging satellites in the constellation. Balancing a desire for rapid schedule updates and efficient satellite use, a scheduling system can advantageously be configured to produce near optimal schedules of events which avoid constraint violations, while producing these schedules rapidly (e.g., in near real-time).

Another goal is to acquire relevant overhead imagery. Relevant overhead imagery can be imagery that has been requested by a customer. Relevant overhead imagery can also be imagery that is not explicitly requested but that would be interesting to a number of people. Thus, it would be advantageous to be able to update and adjust schedules of events for satellites in a network of satellites to introduce new relevant image acquisition tasks. These new relevant image acquisition tasks can be a result of customer requests or predicted demand related to events of interest.

Accordingly, provided herein are systems and methods for scheduling events in a constellation of imaging satellites which can be updated in near real-time, produce near optimal schedules of events, and/or which can automatically generate image acquisition tasks associated with events of interest based at least in part on analysis of crowd-sourced data.

In some implementations, systems and methods are provided for quickly scheduling one or more satellites having pair-wise and cumulative constraints. The systems and methods presented can utilize directed acyclic graphs to increase or maximize a utilization function. Violation of cumulative constraints can be identified at the moment of constraint violation such that events resulting in constraint violations can be removed from the schedule. By removing the events triggering constraint violations at the point of constraint violation, the systems and methods provided can determine optimal or near-optimal schedules in a relatively quick and efficient manner compared to systems which check for constraint violation after producing a schedule.

In some implementations, systems and methods are provided for using crowd-sourced data to identify events of interest and locations associated therewith. Priorities associated with the events of interest can be determined based at least in part on analysis of the crowd-sourced data. The events of interest can be used to generate image acquisition requests that include the locations and priorities of the events. Using a machine-to-machine interface, the image acquisition requests can be sent directly to the scheduling system to produce a schedule of events that includes the requested image acquisition tasks. Producing image acquisition tasks based on crowd-sourced data can occur in near real-time. In some embodiments, no intervening user input is used in generating the image acquisition events based on crowd-sourced data and the scheduled events are generated automatically based on input from a crowd-sourcing system. In this way, a constellation of imaging satellites can generate timely and relevant overhead imagery in an automated fashion and/or in near real-time.

Although certain goals and advantages are described, no single embodiment necessarily must include each and every such goal and advantage. Various implementations can be designed to achieve one, some, or all such goals and advantages and/or other goals or advantages.

BRIEF DESCRIPTION OF THE DRAWINGS

Throughout the drawings, reference numbers can be reused to indicate general correspondence between reference elements. The drawings are provided to illustrate example embodiments described herein and are not intended to limit the scope of the disclosure.

DETAILED DESCRIPTION

Overview

Figure 1:
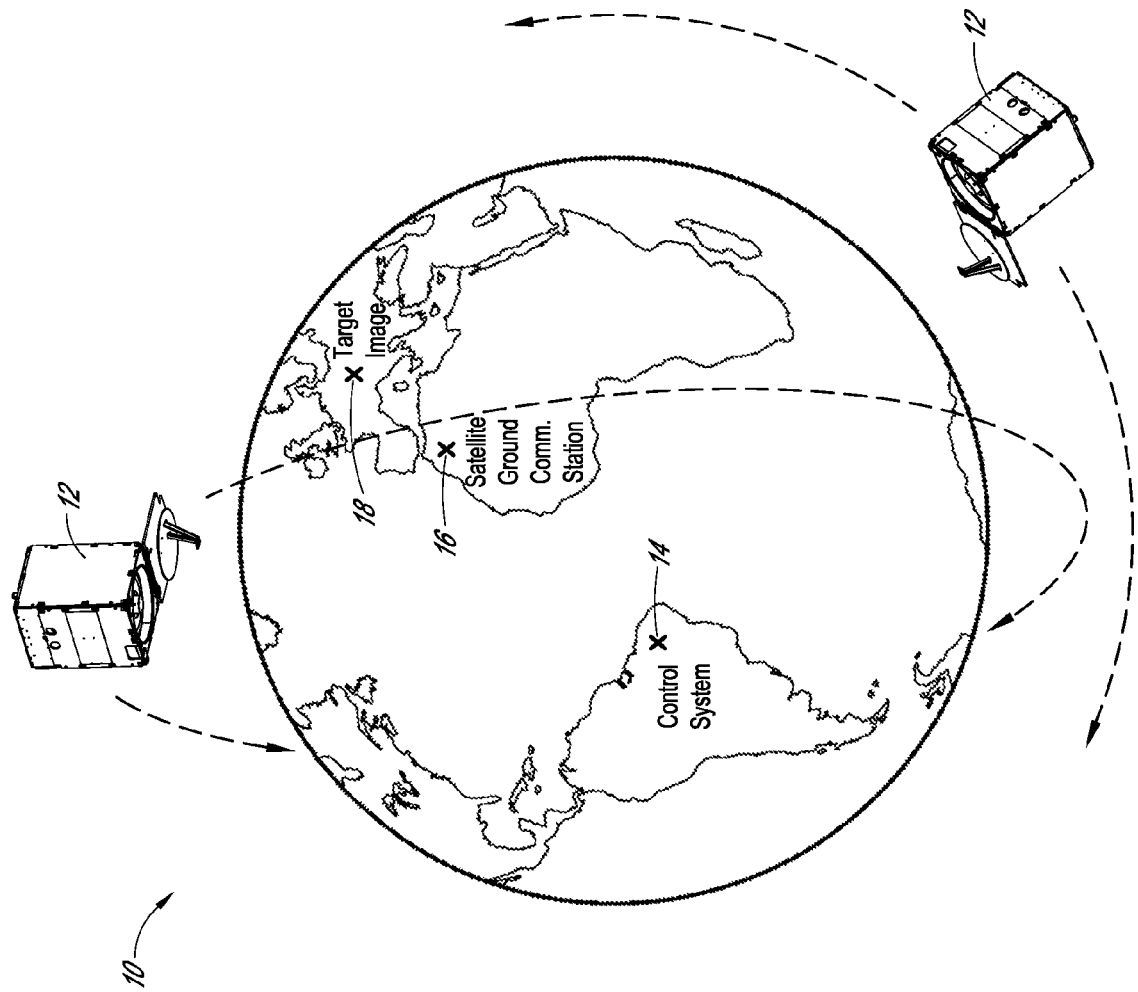
FIG. 1 illustrates a representation of an example constellation of imaging micro-satellites in a low-earth orbit, a control system, a ground communication system, and a target area.

This disclosure is directed to systems and methods for scheduling multiple events with interdependent constraints, and more particularly for producing schedules in a relatively fast and efficient manner. In some implementations, the disclosed systems and methods can be used to produce schedules of events for a constellation of satellites. In some implementations, the scheduling of the constellation of satellites can be based at least in part on data accessed, aggregated, and/or analyzed from social network messages and/or real-time news feeds.

For a constellation of imaging satellites, events which can be scheduled include image acquisition tasks, maintenance tasks, communication tasks, and the like. A scheduling system can generate a schedule of events by incorporating and analyzing a number of inputs, parameters, and variables to produce timely, efficient, and valuable use of the satellites in the constellation.

In some implementations, systems and methods are provided for scheduling one or more objects having pair-wise and cumulative constraints. The systems and methods presented can utilize directed acyclic graphs to increase or maximize a utilization function. Violation of cumulative constraints can be identified at the moment of constraint violation such that events resulting in constraint violations can be removed from the schedule while the schedule is being determined. By removing the events triggering constraint violations at the point of constraint violation, the systems and methods provided can determine optimal or near-optimal schedules in a relatively quick and efficient manner as compared to systems and methods that check for violations of cumulative constraints after determining a schedule.

Described herein are systems and related methodologies that increase or maximize utilization of one or more controllable objects by constructing near-optimal or optimal schedules of events. Further described herein are systems and methods that automatically generate image acquisition requests for a scheduling system based at least in part on analysis of crowd-sourced data. It will be understood that although much of the description herein is in the context of scheduling satellites, one or more features of the present disclosure can also be implemented in systems where finding near-optimal schedules in a fast and efficient manner may be more desirable than finding the most optimal schedule or the schedule that maximizes a particular utilization or cost function. For example, some embodiments of the systems and related methodologies disclosed herein can be used in satellite scheduling (e.g., imaging satellites or communication satellites), air traffic control, emergency vehicle routing and response systems, on-site repair scheduling, and the like. Furthermore, it is to be understood that in finding an optimal or near-optimal solution to a scheduling problem, a cost or utilization function can be increased or maximized in certain implementations, or reduced or minimized in certain implementations, depending on a context in which the scheduling problem occurs. Finding a near-optimal solution to a scheduling problem can mean finding a solution that is sufficiently close to the optimal solution such that a difference between the solution and the optimal solution is less than a tolerance.

The convergence of social networking, mobile devices and location-based services has produced an explosion in the volume of timely, location-identified information about activity across the globe. This may be evidenced in a number of major events around the world, such as earthquakes, floods, tsunamis, riots, armed conflicts, sporting events, rallies, and the like. Social networks are playing a significant role in events across the globe based at least in part with the ease of access to such networks to a large cross-section of people across the world. This has been seen in events such as political uprisings and revolutions whose participants are also users of social networking services such as TWITTER™ and FACEBOOK™ and who may even use these services to coordinate their activities.

Thus, examples of satellite scheduling systems are provided that use crowd-sourced data to generate image acquisition events for a network of imaging satellites. A crowd-sourcing system may utilize crowd-sourced data (e.g., messages generated by users of social network services) to determine events of interest and geographic locations of such events. Event data may then be used to create or update image acquisition tasks and/or task priorities which are automatically provided to a scheduling system to facilitate timely and responsive acquisition of overhead images of the geographic location of the event.

Terminology

Unless explicitly indicated otherwise, terms as used herein will be understood to imply their customary and ordinary meaning. For example, pair-wise constraint is a broad term and is to be given its ordinary and customary meaning to a person of ordinary skill in the art (e.g., it is not to be limited to a special or customized meaning), and includes, without limitation, constraints that prohibit an event based solely on properties of an immediately preceding event. For example, two image collection events are pair-wise constrained if there is insufficient time between the first image collection event and the second image collection event to change a pointing direction of an imaging satellite to perform the second image collection event.

Cumulative constraint is a broad term and is to be given its ordinary and customary meaning to a person of ordinary skill in the art (e.g., it is not to be limited to a special or customized meaning), and includes, without limitation, constraints that prohibit an event based on properties of preceding events. For example, an image collection event can be constrained if by performing the event the temperature of a camera acquiring the image would exceed acceptable temperature limits due at least in part to prior events.

In some implementations, a constellation of satellites can include any type of satellite including but not limited to satellites, mini-satellites, micro-satellites, nano-satellites, and so forth. Micro-satellite is a broad term and is to be given its ordinary and customary meaning to a person of ordinary skill in the art (e.g., it is not to be limited to a special or customized meaning), and includes, without limitation, satellites with a mass less than or equal to about 500 kg and/or physical dimensions less than or equal to about 125 cm×125 cm×175 cm, or satellites that launch as a secondary payload on a launch vehicle. According to some conventions, satellites having a mass less than or equal to about 500 kg are classified as small satellites with further divisions being made based on their mass. For example, in one classification system, small satellites are deemed mini-satellites when they have a mass between about 100 kg and 500 kg, micro-satellites when they have a mass between about 10 kg and 100 kg, nano-satellites when they have a mass between about 1 kg and 10 kg, pico-satellites when they have a mass between about 0.1 kg and 1 kg, and femto-satellites when they have a mass less than or equal to about 100 g. However, any reference to micro-satellite, mini-satellite, or small satellite in this disclosure should be understood to mean the general class of satellites having a mass less than or equal to about 500 kg and/or physical dimensions less than or equal to about 125 cm×125 cm×175 cm; and not to the more specific classification of satellites identified herein or other similar classification schemes.

Overhead image is a broad term and is to be given its ordinary and customary meaning to a person of ordinary skill the in the art (e.g., it is not to be limited to a special or customized meaning) and includes, without limitation, satellite images captured by satellites in earth-orbit, or other overhead images captured by aircraft (e.g., airplanes, helicopters, drones, unmanned aerial vehicles (UAV), balloons, etc.) surveying a geographic region, and the like. In some cases, the overhead image may be of an astronomical object rather than a terrestrial object.

Example Network of Imaging Micro-Satellites

FIG. 1 illustrates a representation of an example constellation 10 of imaging micro-satellites 12 in a low-earth orbit, a control system 14, a ground communication system 16, and an example of a target image area 18. Embodiments of the systems and methods described herein can be used to schedule events in the constellation 10 including, for example, determining which micro-satellite 12 is to acquire an image of the target image area 18, when the image is to be acquired, when the image is to be communicated to the ground communication system 16, and/or other scheduling events. The image can include a plurality of images, video, etc. In some implementations, the imaging micro-satellites 12 can include an image acquisition system configured to acquire multi-spectral and/or pan-spectral images or videos of the target image area 18. The imaging micro-satellites 12 can be owned and/or operated by a single entity or multiple entities. In various implementations, the constellation 10 may include 2, 4, 8, 10, 12, 16, 24, 30, or some other number of satellites. Although FIG. 1 shows an example constellation of micro-satellites 12, in other implementations the constellation 10 can include additional or different types of satellites including telecommunications satellites, mini-satellites, and so forth.

The control system 14 can include functionality that implements embodiments of the scheduling system disclosed herein so as to schedule events in the constellation. For example, the control system 14 can include embodiments of the control system 100 described with reference to FIGS. 2 and 3. The control system 14, 100 can include the scheduling module 104 described with reference to FIGS. 2-4 and 9. Scheduled events can include one or more tasks to be performed, data to be collected, information to be received or transmitted, duration, desired start time, desired end time, desired results, or any combination of these. For example, for an imaging satellite, events can be any task to be performed by the imaging satellite and can generally include, without limitation, imagery collection (e.g., of the target image area 18), imagery downlink (e.g., to the satellite ground communication station 16), and onboard maintenance.

Scheduling events for a constellation of satellites can be computationally difficult, particularly as the number of satellites in the constellation increases. Embodiments of the systems, methods, and algorithms described herein advantageously can be used to schedule events in such constellations efficiently and in real-time or near real-time. For example, the control system 14 can utilize any method described herein for producing optimal or near-optimal schedules, such as the example methods 500 and 700 described herein with reference to FIGS. 5 and 7. Additionally or alternatively, the control system 14 can utilize any method described herein for using crowd-sourced data, such as the example methods 1100 and 1200 described herein with reference to FIGS. 11 and 12.

Example Scheduling Engine Systems and Methodologies

Creating a schedule of events or tasks for an object in a system can be a difficult and computationally intensive problem. One reason is that an object in a system can be subject to various constraints that limit the order and/or number of tasks that can be accomplished. Constraints can be pair-wise constraints, meaning that an event is constrained based solely on properties of an immediately preceding event, or cumulative constraints, meaning that an event is constrained based at least in part on a history of prior events. For example, a slew rate of an imaging satellite (e.g., a micro-satellite 12 in FIG. 1) can be considered a pair-wise constraint because whether an image can be acquired depends at least in part on whether the imaging satellite can change orientation from a previous task in time to acquire an image of a targeted area. The imaging satellite can also be subject to cumulative constraints, such as, for example, duplication constraints, temperature considerations, energy requirements, or data storage. As another example, a pair-wise constraint for an emergency response vehicle can be a combination of a distance between tasks and a typical duration of a task. The emergency response vehicle can also be constrained by cumulative constraints, such as a quantity of an expendable resource that the vehicle is capable of transporting.

Furthermore, systems can include multiple objects to be scheduled, increasing the complexity of the problem. The complexity can increase where a schedule of events for a first object affects a schedule of events for a second object. For example, if a first imaging satellite in a constellation of imaging satellites is schedule to acquire an image of a targeted area, a duplication constraint can dictate that a second imaging satellite not acquire an image of the targeted area to avoid duplicative image acquisitions which may be undesirable. As another example, air traffic control systems can schedule a landing and approach for a first aircraft which affects a landing and approach of a second aircraft.

In some circumstances, it is desirable to create a schedule of events relatively quickly to be able to respond effectively to dynamic situations. Dynamic situations can be those where new events or tasks are being requested or constraints are being updated such that it is desirable to alter a previous schedule on a time scale sufficient to incorporate the new events or constraints without significantly disrupting the objects' performance. To achieve the desired agility with respect to creating updated schedules, some embodiments provide for a control and scheduling system that can be configured to create a schedule of events that is near-optimal (or optimal) in maximizing utilization (or minimizing a cost function) of objects in a system and communicate the schedule of events to the objects. In some embodiments, the control and scheduling system can create a schedule of events in near-real time. In some embodiments, the control and scheduling system can create a schedule of events on a time scale that is less than or equal to a typical length of time between consecutive events.

In some embodiments, a control and scheduling system is provided that can be configured to create a global schedule of tasks for a system of objects wherein the global schedule does not violate pair-wise, cumulative, or duplication constraints. In some embodiments, the control and scheduling system can use directed acyclic graphs to find a desired path through a sequence of events that satisfies the constraints of the system. By using directed acyclic graphs, the scheduling problem can become solvable in polynomial-time, thereby providing an advantage in computation time over other methods of solving scheduling problems of this type which are generally NP-hard. Moreover, the control and scheduling system can take advantage of parallelization to solve multiple graphs or aspects of the same graph at the same time, thereby increasing the speed or reducing the time to produce schedules. In some embodiments, the control and scheduling system exhibits a sub-linear scaling relationship between a number of objects in the system and computing power or time used to create schedules for the objects. As a result, some implementations of the control and scheduling system can produce a schedule of events in near real-time or on a time scale that is less than or comparable to an average length of time between events. Producing a schedule of events in near real-time can include producing the schedule in less than about 20 minutes, in less than about 15 minutes, in less than about 10 minutes, in less than about 5 minutes, or in less than about 1 minute.

Figure 2:
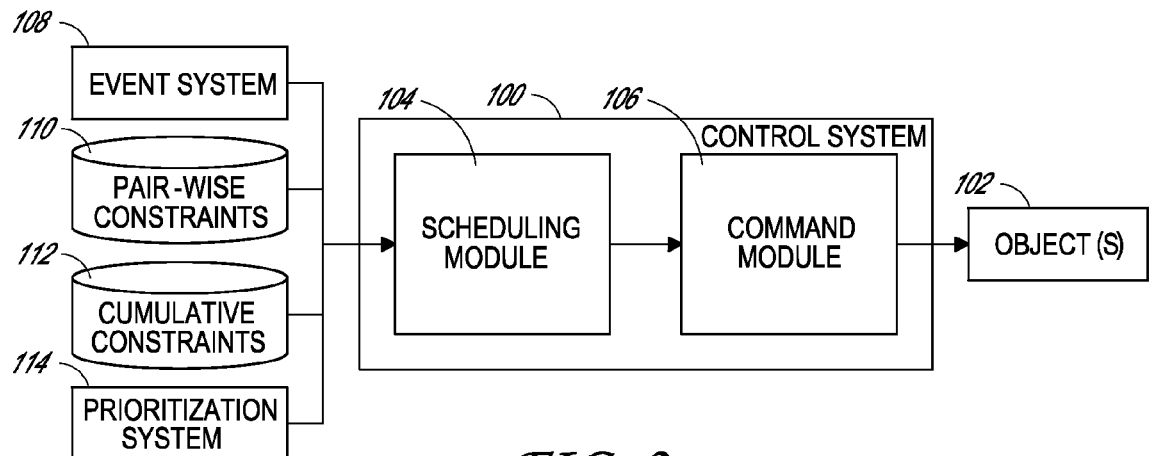
FIG. 2 illustrates a block diagram of an example embodiment of a control system configured to control one or more objects.

FIG. 2 shows a block diagram of an example embodiment of a control system 100 configured to control one or more objects 102. The control system 100 can control the objects 102 by analyzing information (e.g., events to be performed, priorities of events, event or object constraints, etc.), creating an efficient schedule of events based at least in part on the analyzed information, and commanding the objects to perform the scheduled events. The control system 100 includes a scheduling module 104 configured to receive information about events, priorities, and constraints and to produce a schedule of events. The control system 100 includes a command module 106 configured to receive the schedule of events from the scheduling module 104 and convert it into commands. The command module 106 can be configured to communicate those commands to the objects 102 or to another system that can communicate the commands to the objects 102. The control system 100 can be configured to produce a schedule and command the objects 102 to accomplish the events on the schedule in a relatively efficient manner while satisfying defined constraints. The control system 100 can be configured to update the schedule relatively rapidly to, for example, dynamically incorporate new tasks, modify existing tasks, remove tasks, add constraints, modify constraints, remove constraints, modify priorities, or any combination of these.

The control system 100 includes a scheduling module 104 configured to produce an efficient or optimized schedule of events. A schedule of events can include, for example, a list of events, tasks, activities, or routines for one or more objects and corresponding start times of each event. The scheduling module 104 receives events from an event system 108, pair-wise constraints from a pair-wise constraint database 110, cumulative constraints from a cumulative constraint database 112, and/or priority information from a prioritization system 114. The scheduling module 104 can produce a schedule of events that it sends to the command module 106. The schedule of events can be for a particular object 102 or it can be a global schedule with events to be performed by one or more objects 102. Thus, the scheduling module 104 can produce a globally optimal or near-optimal schedule for a plurality of objects 102, such as satellites in a constellation of satellites.

In some embodiments, the scheduling module 104 can receive one or more events from the event system 108 and create a schedule that increases or maximizes a utilization function based at least in part on the one or more events. The utilization function can incorporate information about the events and the objects 102 such that increasing or maximizing the function results in a schedule that efficiently or optimally accomplishes the defined events. For example, the scheduling module 104 can receive or retrieve prioritization information related to events received from the event system 108 and construct a schedule that increases or maximizes the utilization function based at least in part on the prioritization information. As another example, the scheduling module 104 can receive or retrieve constraint information from the pair-wise constraint database 110 or cumulative constraint database 112 and construct a schedule of events that satisfies the constraints while increasing or maximizing the utilization function.

As described more fully herein, certain embodiments of the scheduling module 104 can create efficient or optimal schedules dynamically through the use of directed acyclic graphs. For example, by using directed acyclic graphs, the scheduling module 104 can find an optimal or near optimal schedule while incorporating information about utilization functions, constraints, and prioritization. This graph-based approach to scheduling can result in a relatively fast algorithm that can produce near-optimal schedules for relatively large and complex systems of objects. The graph-based approach can respond dynamically to modifications, additions, or deletions of input parameters in a relatively quick manner compared to typical non-graph-based approaches. For example, the scheduling module 104 can be configured to incorporate changes in tasks, events, constraints, priorities, utilization function, or any combination of these and create a new schedule relatively quickly. In some embodiments, the scheduling module 104 can produce a near-optimal schedule using a directed graph-based approach about an order of magnitude faster than if it were to employ non-graph-based techniques.

The control system 100 includes a command module 106 configured to convert the schedule produced by the scheduling module 104 into commands to send the objects 102. The command module 106 can include a module configured to receive schedule information. The module can convert the information in the schedule to a set of commands to be delivered to one or more objects 102. In some embodiments, the command module 106 includes a communication module configured to communicate the set of commands to the one or more objects 102. For example, the command module 106 can include an array of antennas configured to transmit control instructions based at least in part on a received schedule to one or more satellites. The satellites can receive the transmitted instructions and perform the requested tasks at designated times. The command module 106 can dynamically update the control instructions based at least in part on updated scheduling information received from the scheduling module 104.

The objects 102 can be one or more satellites, vehicles, machines, people, group of people, or some combination of people and machines capable of being controlled. In some embodiments, the objects 102 comprise satellites configured to respond to control instructions received from a control system 100. For example, in response to control instructions received from the control system 100, a satellite can adjust its attitude, transfer stored data to a ground station at a designated time based, operate an onboard system in a defined manner based, perform a maintenance routine, acquire an image with an imaging system, or any combination of these or the like. In some embodiments, the objects 102 are aircraft such as airplanes or helicopters, emergency vehicles, repair teams, or the like.

The control system 100 can receive information from the event system 108. The event system 108 can be a system that creates, collects, receives, generates, and/or organizes events to be performed by the objects 102. An event can be a collection of instructions and/or information as defined by the event system 108, and can include, for example, one or more tasks to be performed, data to be collected, information to be received or transmitted, duration, desired start time, desired end time, desired results, or any combination of these. For example, for an imaging satellite, events can be any task to be performed by an imaging satellite and can generally include, without limitation, imagery collection, imagery downlink, and onboard maintenance. Imagery can include still images and/or video. The event system 108 can collect event requests from other systems. For example, the event system 108 can include a user interface and receive requests from a user. The event system 108 can interface with other systems that aggregate event requests for the objects 102. The event system 108 can receive or produce event requests based at least in part on a set schedule of events, such as routine scheduled maintenance. The event system 108 can produce event requests based at least in part on satisfaction of defined criteria, such as transmitting information when in range of a receiving station. The event system 108 can transmit an event or list of events to the scheduling module 104 at regular intervals, upon request from the control system 100, upon receiving or producing a new event request, or any combination of these. As described more fully herein with reference to FIGS. 5 and 6, events can be used to define nodes in a graph-based approach to finding a desirable schedule.

The control system 100 can be configured to retrieve or receive pair-wise constraints from the pair-wise constraint database 110. Pair-wise constraints can be a property of the objects 102 that place functional limits on the objects' 102 ability to perform consecutive events. A pair-wise constraint can mean that whether the object 102 is capable of performing an event is determined based at least in part on properties of an immediately preceding event. For example, consecutive image collection events in an imaging satellite can be constrained by a satellite's agility. Agility refers to an ability of a satellite to slew from one pointing angle to another pointing angle within a defined period of time. For example, if a first collection has a first end time and a first pointing angle and a second collection has a second start time and a second pointing angle, then a pair-wise constraint would be violated if a maximum slew rate of the satellite would not be sufficient to transition the satellite from the first pointing angle to the second pointing angle in the time between the first end time and the second start time. As described more fully herein with reference to FIG. 5, pair-wise constraints can be used to create connections between nodes in a graph-based approach to finding a desirable schedule.

The control system 100 can be configured to retrieve or receive cumulative constraints from the cumulative constraint database 112. Cumulative constraints can be a property of the objects 102 that place functional limits on the objects' 102 ability to perform an event. A cumulative constraint can mean that whether the object 102 is capable of performing an event is determined based at least in part on a history of prior events. For example, an image collection event in an imaging satellite can be constrained by data capacity limitations, power requirements, and/or thermal considerations. As described more fully herein with reference to FIG. 5, cumulative constraints can be used during a computation of a path through a collection of graphs in a graph-based approach to finding a desirable schedule.

Data capacity limitations can refer to limits on the imaging satellite in terms of storing bits of data and transmitting the bits of data to a receiving station. Data capacity limitations can refer to an amount of onboard storage on the imaging satellite. Data capacity limitations can refer to an operational constraint that forces the imaging satellite to transmit all stored data to a receiving station during a data transmission event. Data capacity limitations are cumulative constraints because a history of prior events determines whether a data capacity limitation would be violated. For example, if onboard storage is nearing maximum capacity, attempting to store an additional image acquisition could require more data storage than is available. The additional image acquisition event would therefore violate the cumulative constraint.

Power requirements can refer to an ability of the imaging satellite to keep its subsystems provided with enough power to function. The imaging satellite can have various source of power such as solar panels and/or batteries. Different operational and/or situational states of the imaging satellite can be power-positive, such as when the imaging satellite is exposed to sunlight and not acquiring imagery, or power-negative, such as during image acquisition. An energy budget of the imaging satellite can be managed through the use of a power requirement cumulative constraint to ensure that there is sufficient power on the imaging satellite to perform desired or critical tasks.

Thermal considerations can refer to an ability of the imaging satellite to safely keep a temperature of its components within safe-operating margins. For example, components of the imaging satellite can include the camera, the payload electrical subsystem, and the payload radio subsystem. The temperature of components can vary depending on operational and situational states, such as whether the system is on or whether the satellite is exposed to the sun. Whether a particular event will result in an unacceptable temperature on a component depends at least in part on a history of the component. For example, whether an imaging event will cause the camera's temperature limit to be violated depends at least in part on the state of the camera in the time preceding the event.

The control system 100 can receive priority information from the prioritization system 114. The prioritization system 114 can be a system that assigns weights or priorities to events. The priorities can be configured to assign a relative weight to events such that events with high priorities are preferable to events with low priorities. The prioritization system 114 can transmit the priorities to the control system 100 for use in the scheduling module 104. The prioritization system 114 can assign priorities to events according to user input, internal algorithms, external factors, or any combination of these. In some embodiments, the prioritization system 114 can assign a relatively large priority to events that are critical, effectively forcing the scheduling module 104 to include the critical events in any schedule it produces. The prioritization system 114 can assign priorities based at least in part on a variety of factors such as customer demands, price, timeliness of an event, and other factors. As described more fully herein with reference to FIG. 5, priorities can be used to weight edges between nodes for use in computing a path through a collection of graphs in a graph-based approach to finding a desirable schedule.

In some embodiments, the scheduling module 104 and the command module 106 are components in a unitary control system 100. In some embodiments, the scheduling module 104 and the command module 106 are physically distinct systems configured to communicate with one another through a network, direct wired connection, direct wireless connection, or through another means. The event system 108, the pair-wise constraints database 110, the cumulative constraints database 112, and the prioritization system 114 can be components of a unitary system, part of the control system 100, physically distinct systems, or any combination of these.

Figure 3:
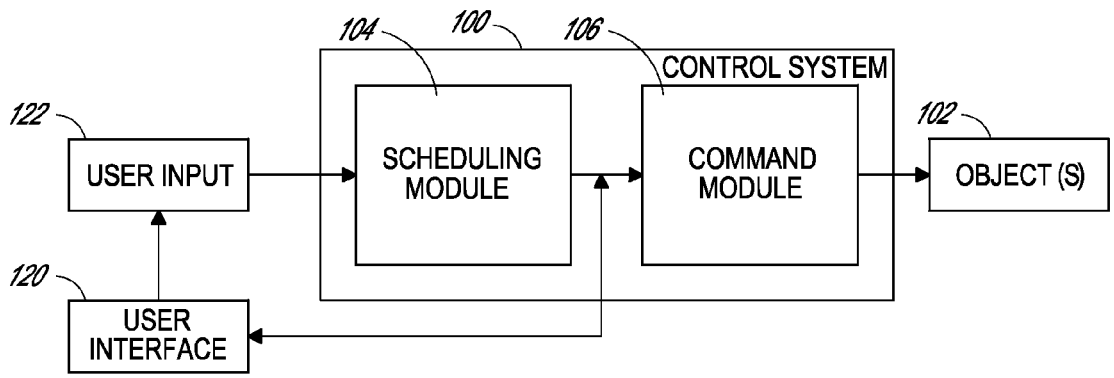
FIG. 3 illustrates a block diagram of an example embodiment of a control system incorporating a user interface.

FIG. 3 illustrates a block diagram of an example embodiment of a control system 100 incorporating a user interface 120. The control system 100 receives input from user input 122 and outputs information about a proposed schedule to the user interface 120. Through user input 122, a user can transmit information concerning events, constraints, and/or priorities to the control system 100. The user input 122 can be received from a user via a computing device such as a server, a desktop computer, a laptop, a tablet, a smartphone, a personal digital assistant (PDA), and the like. The user can view results of a scheduling process through the user interface 120 (e.g., a user interface on the computing device). In some embodiments, the user can view the results of the scheduling process on the user interface 120 and, through the user input 122, provide additional feedback to the control system 100 to achieve a new result. In some embodiments, the command module 106 will wait for user input or approval through user input 122 before proceeding with sending control instructions to object(s) 102.

The user interface 120 can include a display that allows the user to view scheduling information produced by the scheduling module 104. The user interface 120 can include elements that allow the user to interact with the information, simulate changes in schedules according to proposed changes to input parameters, view detailed results about a proposed schedule and/or alternate schedules, and the like. The user interface 120 can be provided on a server, desktop computer, tablet, smartphone, PDA, or the like.

The user input 122 can provide the user an ability to transmit information to the scheduling module 104. The user input 122 can be part of the same system as the user interface 120, the scheduling module 104, the command module 106, the control system 100, or any combination of these. The user input 122 can include physical elements that allow the user to send information to the scheduling module such as, for example, a keyboard, touch screen interface, microphone, camera, joystick, buttons, switches, or other similar user input elements or combination of elements. In some embodiments, the user interface 120 and the user input 122 are a unitary system such as a computer, tablet, smartphone, PDA, or the like. In this way, the user can connect to the control system 100 to provide input and guidance regarding controlling objects 102. In some embodiments, the user interface 120 and/or the user input 122 can communicate with each other and/or with the control system 100 via a network. The network can include a wired, wireless, terrestrial, and/or satellite network, which can include a local area network (LAN), a wide area network (WAN), the Internet, and so forth.

In some embodiments, the control system 100 receives information about events, constraints, and/or priorities from external systems or databases in addition to receiving information through user input 122. The control system 100 can function without input from the user, but the user can input information to alter or change the results of the scheduling module 104.

Scheduling Module

Figure 4:
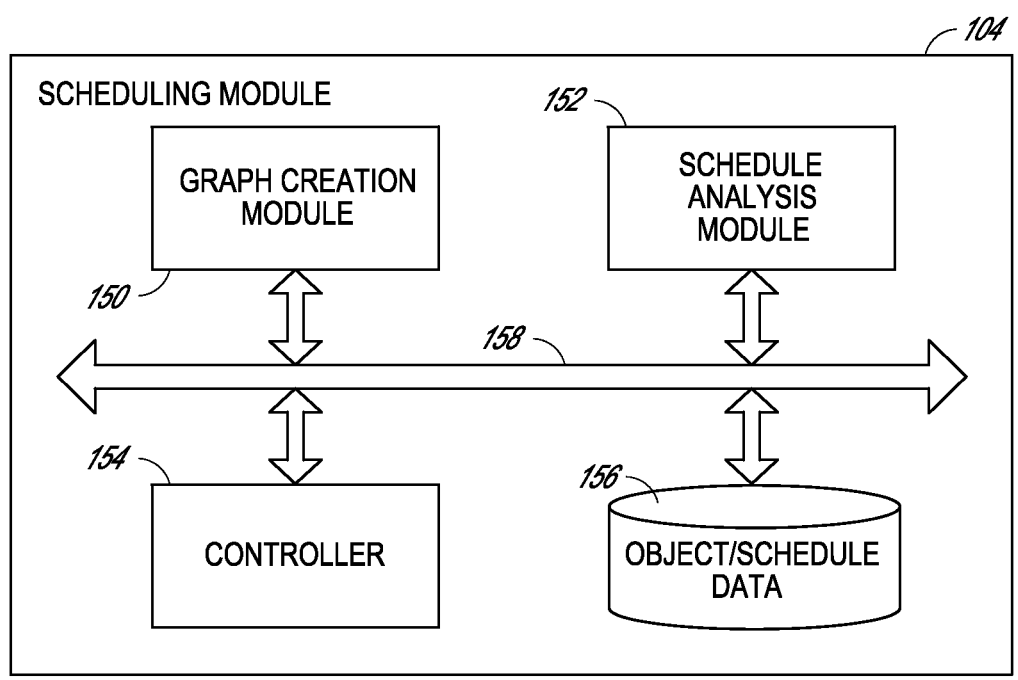
FIG. 4 illustrates a block diagram of an example embodiment of a scheduling module.

FIG. 4 illustrates a block diagram of a scheduling module 104 according to some embodiments. The scheduling module 104 can include hardware, software, and/or firmware components used to produce schedules for the control system 100. The scheduling module 104 can be configured to receive information from various systems, create one or more graphs based at least in part on the received information, determine a desirable path through the created graphs, and communicate the desirable path to one or more systems such as the command system 106. The scheduling module 104 can include a graph module 150, a schedule analysis module 152, a controller 154, and object/schedule data storage 156. Components of the scheduling module 104 can communicate with one another, with external systems, and with other components of the control system 100 over communication bus 158. The scheduling module 104 can employ any method described herein for producing optimal or near-optimal schedules, such as the example methods 500 and 700 described herein with reference to FIGS. 5 and 7. Additionally or alternatively, the scheduling module 104 can employ any method described herein for using crowd-sourced data, such as the example methods 1100 and 1200 described herein with reference to FIGS. 11 and 12.

The scheduling module 104 includes a graph module 150. The graph module 150 can be configured to create directed acyclic graphs based at least in part on events and pair-wise constraints. Directed acyclic graphs can include nodes which represent events and directed edges which connect nodes and represent allowable sequences of events, see FIG. 6 for an example directed acyclic graph 600. The graph module 150 can receive a list of events from which a schedule of events will be made. For each event, the graph module 150 can create one or more nodes representing discretized start times and/or duration for the event. Once nodes for more than one event are created, the graph module 150 can create edges between nodes in different events. The graph module 150 can start with a first node in a first event and attempt to create a directed edge pointing from the first node to a node in a different event. The graph module 150 will create the directed edge if connecting the two nodes does not violate any pair-wise constraints. The graph module 150 can effectively force a critical event, if desired, to be included in a schedule by creating a graph where all acceptable paths through the graph pass through the critical event. A critical event is optional and for certain schedules no critical events are used. For schedules in which a critical event is desired, in order to force the critical event, the graph module 150 may create a graph that is different from a graph that would have been constructed otherwise, removing edges that do not violate pair-wise constraints but that would have resulted in bypassing the critical event. For example, in FIG. 6 some paths through the graph bypass image collection event 610c. To make image collection event 610c a critical event, the graph module 150 would remove the edges that directly connect nodes in image collection event 610b to nodes in downlink event 620a. In making an event a critical event, the graph module 150 can also remove some nodes because any path through those nodes would result in the critical event being missed.

The scheduling module 104 includes a schedule analysis module 152. The schedule analysis module 152 analyzes paths through graphs produced by the graph module 150. For each graph, the schedule analysis module 152 attempts to find a path through the graph that maximizes or minimizes a utilization or cost function. As described more fully with reference to FIG. 5, the schedule analysis module 152 can check for constraint violation while maximizing the utilization function. In contrast to systems that maximize the utilization function first and check for violation of cumulative constraints after, the schedule analysis module 152 can identify nodes in a path which would violate cumulative constraints if included during the procedure to find an optimal schedule. The schedule analysis module 152 can remove the node at the moment it finds that its inclusion would violate a cumulative constraint. Once removed, the schedule analysis module 152 can proceed in the optimization procedure. In this way, the schedule analysis module 152 finds a path through the graph that does not violate any constraints and that is near-optimal. Near-optimal in this case can mean that the path identified may not be the path that truly maximizes utilization, but that it is sufficiently close to the optimal path that it is satisfactory.

Typically, an optimal path through a graph would be a path that maximizes the utilization function without violating any cumulative constraints, which may require many iterations through the graph to determine which path through the graph results in this maximum utilization. The schedule analysis module 152 can find a path that approaches or achieves maximum utilization with the same or fewer iterations, because it identifies paths that violate cumulative constraints at the point of constraint violation. When this happens, the schedule analysis module can remove the offending portion of the path and proceeds with the optimization procedure. It may be the case that removing the identified portion of the path does not result in a truly maximized utilization (e.g., removing a different portion of the path would result in a higher utilization), but by removing the offending portion of the path at the point of constraint violation allows the schedule analysis module 152 to arrive at an optimal or near-optimal path through the graph with relatively fewer iterations, and thus with greater speed and/or efficiency. Furthermore, the schedule analysis module 152 limits removal of an edge or node at a point in the graph before constraint violation rather than attempting to remove edges or nodes throughout the graph to achieve an optimized path. Thus, the schedule analysis module 152 can efficiently construct a near-optimal path through the graph that does not violate any constraints.

The scheduling module 104 includes a controller 154. The controller 154 can include one or more hardware processors and can be used by any of the other components, such as the graph module 150 or the schedule analysis module 152, to process information. As used herein, the term "processor" refers broadly to any suitable device, logical block, module, circuit, or combination of elements for executing instructions. The controller 154 can be any conventional general purpose single- or multi-chip microprocessor. In addition, the controller 154 can be any special purpose microprocessor such as a digital signal processor. The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA), or other programmable logic device, discrete gate or transistor logic, discrete hardware components, circuitry, or any combination thereof designed to perform the functions described herein. A general purpose processor, such as controller 154, can be a conventional microprocessor, but the controller 154 can also be any conventional processor, controller, microcontroller, or state machine. Controller 154 can also be implemented as a combination of computing devices, e.g., a combination of a DSP and a microprocessor, a plurality of microprocessors, one or more microprocessors in conjunction with a DSP core, or any other such configuration.

The scheduling module 104 includes object/schedule data storage 156. Data storage 156 can be coupled to the other components of the scheduling module 104, such as the controller 154, the graph module 150, and the schedule analysis module 152. Data storage 156 can refer to non-transitory electronic circuitry that allows information, typically computer data, to be stored and retrieved. Data storage 156 can refer to external devices or systems, for example, disk drives, optical drives, or solid state drives. Data storage 156 can also refer to fast semiconductor storage (chips), for example, Random Access Memory (RAM) or various forms of Read Only Memory (ROM), which are directly connected to the one or more processors of the scheduling module 104. Other types of memory include bubble memory and core memory.

Example Method for Finding Near-Optimal Schedules

The scheduling module 104 can use various methods utilizing directed graphs for finding an optimal or near-optimal schedule of events. The scheduling problem as generally described can belong to a class of problems that are NP-hard, due at least in part to the fact that it is an optimization problem mixing continuous variables (e.g., start time of an event) and discrete variables (e.g., choosing which events to perform). One result of graph theory is that finding a longest or shortest path through a set of directed acyclic graphs is generally solvable in polynomial time.

As generally constructed, the scheduling problem attempts to find a sequence of events that maximizes (or minimizes) a utilization (or cost) function. For example, a cost function can incorporate a binary indicator, $c_i$, for whether an event, i, is selected; a time of completion for an event, $t_i$; and a priority or weight for the event, $w_i$. Expressed mathematically, the problem is to find a maximum of the sum of the product of the binary indicator and the priority, $c_i w_i$, where the event, i, has a start time, $t_i$, that is after an earliest acceptable start time, $st_i$, and before a latest acceptable start time, $et_i$:

$$\max \Sigma_{i=0}^{N} c_i w_i \text{ where } c_i \in 0,1 \text{ and } st_i \leq t_i \leq et_i$$

To incorporate constraints, additional criteria are used. For example, a pair-wise constraint can be included, $pw_{con}(t_{i+1}, t_i)$, and a cumulative constraint can be included, $X_i$:

$$\max \sum_{i=0}^{N} c_i w_i$$

$$s.t.(\forall \ i): c_i \in 0, 1$$

$$t_i > st_i$$

$$t_i < et_i$$

$$t_{i+1} - (t_i + \tau_i) \geq c_{i+1} \times c_i \times pw_{con}(t_{i+1}, t_i)$$

$$X_i < X_{max}$$

The pair-wise constraint can depend on a time between an end of a first event, $t_i + \tau_i$, and a beginning of a second event, $t_{i+1}$, where $\tau_i$ is a duration of event i. For an imaging satellite, a pair-wise constraint can be an agility function which depends on pointing angles, $\theta$, between events. Cumulative constraints for the imaging satellite can include a temperature of the camera, $T_{CAM}$, a temperature of an electrical system, $T_{ES}$, a temperature of a radio system, $T_{RS}$, data stored at the end of an event, d, and energy remaining after an event, e. The function to maximize, in this case, would then be:

$$\max \sum_{i=0}^{N} c_i w_i$$

$$s.t. (\forall\, i): c_i \in 0,$$

$$1t_i > st_i t_i < et_i t_{i+1} - (t_i + \tau_i) \geq c_{i+1} \times c_i \times \text{agility}$$

$$(\theta_{i+1}(t_{i+1}), \theta_i(t_i))$$

$$T_{CAM_i} < T_{CAM_{max}}$$

$$T_{ES_i} < T_{ES_{max}}$$

$$T_{RS_i} < T_{RS_{max}}$$

$$d_i < d_{max}$$

$$e_i < e_{max}$$

In this example, the utilization function is a sum of the priority weights for the events which are actually selected. The output of the optimization will be the subset of events which will be performed (and their associated start times) which maximizes the utilization function while obeying the constraints of the system. As stated above, this optimization problem is difficult because it is a mix of discrete and continuous variables.

The cumulative constraints can be calculated over time. To do so, information at a previous stage can be used along with a function which describes how the cumulative constraint develops over time. The result is an equation which represents each variable associated with a cumulative constraint at a given point in time, examples of which are given in the below equations:

$$T_{cam_{i+1}} = c_{i+1} \cdot cam_{ON}(t_{i+1}, \tau_{i+1}, T_{cam_i}, t_i + \tau_i) + (1 - c_{i+1}) \cdot cam_{OFF}(t_{i+1}, T_{cam_i}, t_i + \tau_i)$$

$$T_{pes_{i+1}} = c_{i+1} \cdot pes_{ON}(t_{i+1}, \tau_{i+1}, T_{pes_i}, t_i + \tau_i) + (1 - c_{i+1}) \cdot pes_{OFF}(t_{i+1}, T_{pes_i}, t_i + \tau_i)$$

$$T_{prs_{i+1}} = c_{i+1} \cdot prs_{ON}(t_{i+1}, \tau_{i+1}, T_{prs_i}, t_i + \tau_i) + (1 - c_{i+1}) \cdot prs_{OFF}(t_{i+1}, T_{prs_i}, t_i + \tau_i)$$

$$d_{i+1} = c_{i+1} \cdot \text{data}_{ON}(\tau_{i+1}, d_i)$$

$$e_{i+1} = c_{i+1} \cdot \text{energy}_{ON}(t_{i+1}, \tau_{i+1}, e_i, t_i + \tau_i) + (1 - c_{i+1}) \cdot \text{energy}_{OFF}(t_{i+1}, e_i, t_i + \tau_i)$$

In the above equations, functions are used which represent effects on the variables when a particular system is on (e.g., $X_{ON}(\ldots)$) and off (e.g., $X_{OFF}(\ldots)$).

One approach to finding an optimal path is to use directed graphs. Using this approach, each event becomes a node in a graph with edges connecting nodes representing sequences of events that do not violate defined constraints, see FIG. 6 for an example of a directed acyclic graph 600. The edges can be weighted to represent their cost, where a sum total of the cost can be maximized or minimized depending on the application. For example, for an imaging satellite application, the longest path or the maximum cost or utility can represent the most desirable list of events that can be accomplished within a given time frame. A path through the directed graph represents an acceptable schedule of events. Algorithms for finding a shortest path through a graph include, for example, Dijkstra's algorithm, described in E. W. Dijkstra, "A Note on Two Problems in Connexion with Graphs," Numerische Mathematik, Vol. 1, No. 1, pages 269-271 (1959). Other algorithms for finding a shortest or longest path through a graph can be used in other embodiments, such as, e.g., the Bellman-Ford algorithm, the Floyd-Warshall algorithm, or Johnson's algorithm.

Figure 5:
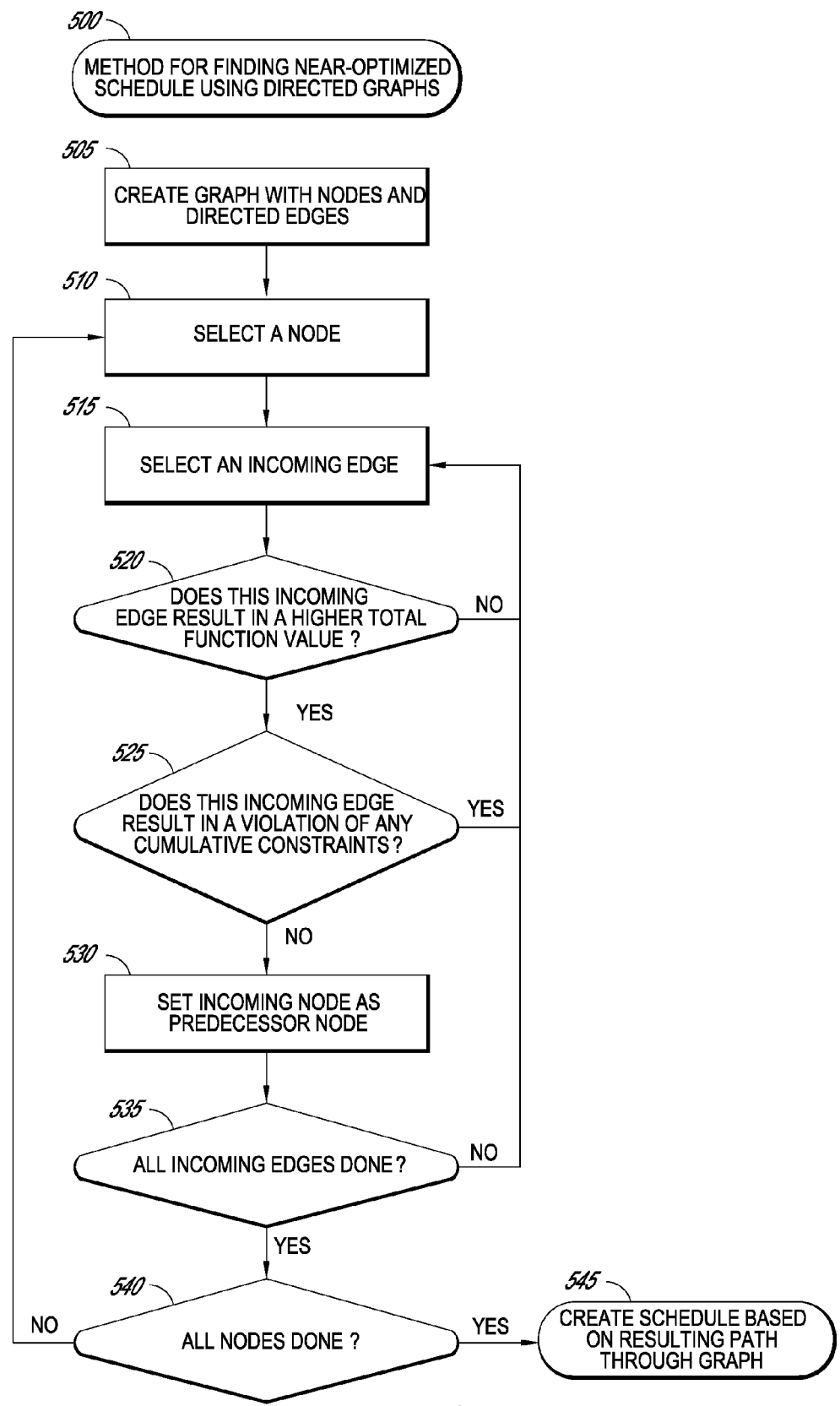
FIG. 5 illustrates a flow chart of an embodiment of a method for finding a near-optimal schedule using a graph.
Figure 6:
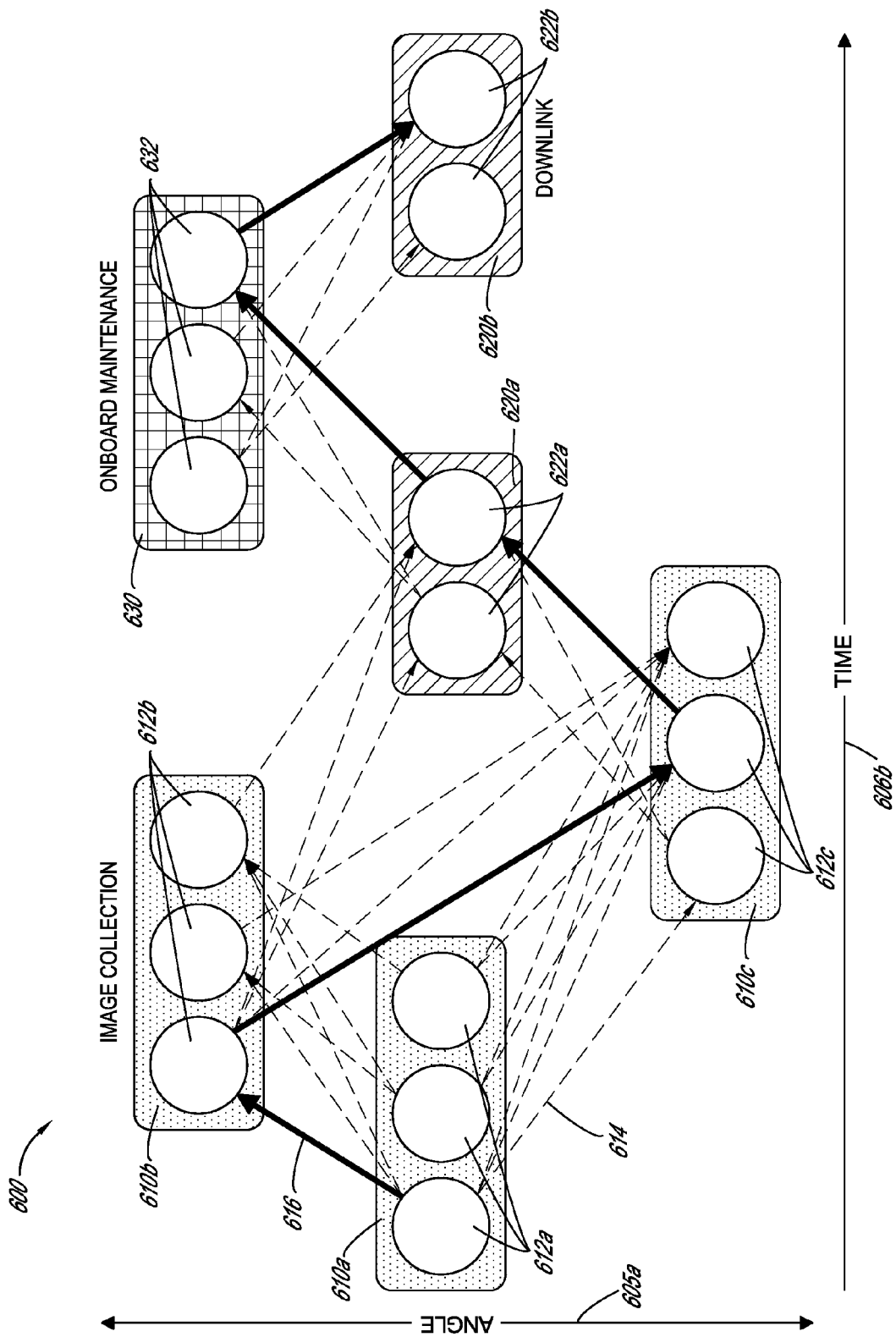
FIG. 6 illustrates an example graph showing possible paths through the graph and an example of a near-optimal path.

FIG. 5 illustrates a flow chart of an example method 500 for finding a near-optimal schedule using directed graphs. For ease of description, the blocks in the method 500 will be described as being performed by the scheduling module 104. Blocks in the method 500, however, can be performed by various systems or modules or combination thereof. In addition, throughout the description reference will be made to an example directed acyclic graph 600 as illustrated in FIG. 6.

In block 505, the scheduling module 104 creates a graph having nodes and edges connecting nodes. For example, the scheduling module 104 can create the graph 600 having events 610a, 610b, 610c, 620a, 620b, and 630 where each event has one or more nodes corresponding to reference numbers 612a, 612b, 612c, 622a, 622b, and 632. Edges 614 connect nodes where an edge connecting two nodes is drawn if performing both nodes in sequence does not violate pair-wise constraints. Because no edges are included in the graph which would violate pair-wise constraints, any path through the graph is not pair-wise constrained. At this point, the scheduling module 104 can incorporate critical event information. A critical event can be an event that is required or highly desirable. A particular graph may or may not include one or more critical events. The scheduling module 104 can alter the graph such that the critical event or events are not bypassed in any way, or that all paths through the graph include nodes in the critical event or events. For example, in FIG. 6 event 610c can be made critical by removing edges 614 that connect nodes 612b in image collection event 610b to nodes 622a in downlink event 620a. The scheduling module 104 can receive information about events, constraints, priorities, critical events, and the like from sources such as, for example, a user or users, remote modules or systems, local modules or systems, data storage, or the like.

In block 510, the scheduling module 104 selects a node. There can be a starting node and a corresponding ending node, with all other nodes falling between the starting node and ending node. The scheduling module 104 can iterate through the nodes in the graph one at a time to find an optimal or near-optimal path. In block 515, the scheduling module 104 selects an incoming edge for the selected node. The incoming edge is an edge that originates in a preceding node and terminates at the selected node. The scheduling module 104 can iterate through incoming edges at the selected node to determine the edge that has the highest incoming value that does not violate cumulative constraints.

In block 520, the scheduling module 104 checks the value of the selected incoming edge to determine whether it results in a higher total value of the utilization function. The value of the selected incoming edge can correspond to a weight or priority value assigned to the edge. The value of the selected incoming edge can correspond to a value of the utilization function of an incoming path. Thus, the scheduling module 104 can select the incoming edge which would result in the highest utilization value. Where the value of the selected incoming edge corresponds to a value of an incoming path, not just an individual incoming edge, the scheduling module 104 can select the incoming path that results in the highest utilization value.

In block 525, the scheduling module 104 checks whether including the selected incoming edge in the path would violate any cumulative constraint. The selected incoming edge can include information about a corresponding incoming path. The scheduling module 104 can calculate a value of one or more parameters related to cumulative constraints to check whether inclusion of the preceding path would result in a violation of the constraints. If a constraint is violated, the incoming path is not included in the final path. In this way, the scheduling module 104 can construct a path that does not violate any constraints and that is optimal or near optimal. It may be near optimal where a preceding edge other than the incoming edge is a primary contributor to a violation in the cumulative constraint. In that case, removal of the primary contributor may result in a path with a higher utilization. For example, if the scheduling module 104 determines that including the incoming edge would violate a cumulative constraint, it may be that removing a predecessor edge included in the incoming path would result in an incoming path that does not violate cumulative constraints but that would result in a higher utilization value. However, to discover the optimal predecessor edge to remove can require more time and/or computational power than is desirable. Thus, utilizing the method 500, the scheduling module 104 can determine, in a relatively quick and/or efficient manner, a path that is sufficiently close to the optimal path to be satisfactory for an intended purpose. For example, in a constellation of imaging satellites, it may be desirable or more valuable to be able to quickly update schedules to respond to changing needs and/or customer requests rather than finding the maximum utilization of the constellation.

If the selected incoming edge results in a higher total value of the utilization function and does not violate any cumulative constraints, the scheduling module 104 includes the originating node as the predecessor node for the currently selected node in block 530.

In block 535, the scheduling module 104 checks whether all the incoming edges have been checked. If there are remaining incoming edges, the scheduling module 104 returns to block 515. If all incoming edges have been checked, the scheduling module 104 checks whether all nodes in the graph have been analyzed in block 540. If there are additional nodes, the scheduling module 104 returns to block 510 to select a different node. If all nodes have been analyzed, the scheduling module 104 concludes the method by producing the optimized or near-optimized schedule by backtracking via the selected predecessor nodes in block 545. In FIG. 6, the optimized or near-optimized schedule corresponds to the bolded arrows 616 through the graph 600.

In some implementations, the algorithm in blocks 515 through 540 can be represented as follows:

```
for i ∈ in-edges_j do
    if dist_i + w_ij > dist_j then
        dist_j ← dist_i + w_ij
        prev_j ← i
    end if
end for
```

In the construction, optimization is achieved by looping through nodes and for each node, j, choosing the longest incoming cumulative path, $dist_j$. The set in-edges$_j$ is all the nodes that have edges originating in a different node and terminating in node j. This set is the closed set of nodes from which a predecessor node (prev$_j$) will be chosen for node j. The weights, $w_{ij}$, represent the priority or weighted value of the edge connecting nodes i and j.

To incorporate cumulative constraints, the above example algorithm can be modified to include steps to check for constraint violation:

```
for i ∈ in-edges_j do
    if dist_i + w_ij > dist_j then
        if CUMUL_1 (t_j, τ_j, X_i, t_i + τ_i)) < X_max then
```

-continued

```
            X_j ← CUMUL_1 (t_j, τ_j, X_i, t_i + τ_i))
            dist_j ← dist_i + w_ij
            prev_j ← i
        end if
    end if
end for
``` where $CUMUL_1$ represents a function that calculates a value for a parameter, X, where the parameter corresponds to a cumulative constraint. The function can calculate a value of the parameter assuming the two events in question are performed. The function can incorporate information about prior events such that the function represents the value of the parameter for a particular incoming path. Thus, the scheduling module 104 can identify edges that result in violations of cumulative constraints at the time the constraint is violated. The scheduling module 104 can remove that edge from the path and continue through the method 500 to find the optimal path that does not include the edge which violates the cumulative constraint.

Constraints can be added, removed, or modified using this and similar formulations, allowing for schedules to be updated dynamically according to changing circumstances. For example, an additional constraint can be added to the system. The additional constraint would result in adding an additional "if" statement in the above algorithm with an appropriate equation and/or comparison. Similarly, a constraint can be removed by removing the corresponding "if" statement. Similarly, a constraint can be modified by modifying the corresponding constraint value (e.g., $X_{max}$) or constraint function (e.g., $CUMUL_1$). Examples of additional constraint functions are provided below:

$$cam_{ON}(t_j,\tau_j,T_{cam_i}t_i+\tau_i)) < T_{cam_{max}}$$

$$pes_{ON}(t_j,\tau_j,T_{pes_i} t_i+\tau_i)) < T_{pes_{max}}$$

$$data_{ON}(\tau_j,d_i)) < d_{max}$$

$$energy_{ON}(t_j,\tau_j,e_i,t_i+\tau_i)) < e_{max}$$

Additionally, where such constraint functions are utilized, corresponding changes to the constraint values should be incorporated into the function:

$$T_{cam_j} \leftarrow cam_{ON}(t_j,\tau_j,T_{cam_i}t_i+\tau_i)$$

$$T_{pes_j} \leftarrow pes_{ON}(t_j,\tau_j,T_{pes_i}t_i+\tau_i)$$

$$d_j \leftarrow data_{ON}(\tau_j,d_i)$$

$$e_j \leftarrow energy_{ON}(t_j,\tau_j,e_i,t_i+\tau_i)$$

In some embodiments, the scheduling module 104 can utilize parallelization to solve multiple graphs (or aspects of the same graph) at the same time. For example, the node-centric algorithm embodied by the method 500 can be run for many different nodes at the same time where nodes are independent of preceding nodes (e.g., the nodes are not connected by an edge of combination of edges). Independent nodes can be optimized in parallel which effectively flattens the graph so that its total computational time can be on the order of the largest number of edges between the starting and ending nodes (which in general is less than or equal to the total number of nodes in the graph). In some embodiments, the scheduling module 104 exploits parallelization by optimizing different graphs representing different spans of time in parallel. In some embodiments, the scheduling module 104 can create multiple clones of graphs with differences between them to exploit parallelization and find a highest-valued path among the near-optimal paths produced, thereby allowing the scheduling module 104 to find or more closely approximate the optimal path through the graph. For example, the scheduling module 104 can clone graphs and remove edges suspected of causing a cumulative constraint to be violated. Suspect edges can be limited to those edges that occurred prior in time to the constraint violation. Due at least in part to the removal of suspect edges, the scheduling module 104 can identify a path through the graph that approaches the optimal path. Due at least in part to limiting the removal of edges to those that happened prior in time, the scheduling module 104 can relatively quickly determine a desirable path through the graph. Parallelization can be advantageous due at least in part to the availability of massively parallelizing computation using commodity hardware and software for distributed computing such as the APACHE™ HADOOP™ software library (available from The Apache Software Foundation).

As referenced above, FIG. 6 illustrates an example graph 600 showing possible paths 614 (dashed lines) through the graph and a near-optimal path 616 (heavy solid line). The graph 600 can represent events for a constellation of imaging satellites such as the example constellation 10 shown in FIG. 1. The graph includes image collection events 610a, 610b, and 610c; downlink events 620a and 620b; and an onboard maintenance event 630. For each event 610a, 610b, 610c, 620a, 620b, and 630, there are one or more nodes 612a, 612b, 612c, 622a, 622b, and 632. Edges 614 represent acceptable sequences of events where the sequence is not pair-wise constrained. For example, an edge 614 originating in a node 612a and terminating in node 612b indicates that performing the image collection event 610a corresponding to a particular node 612a followed by performing the image collection event 610b corresponding to a particular not 612b does not violate any pair-wise constraints such as an agility constraint. In the graph 600, the vertical axis 605a corresponds roughly to slewing angle and the horizontal axis 605b corresponds to time. Some events in the graph 600 do not require a defined pointing angle, such as the onboard maintenance event 630, but is represented as having a particular angle in the graph 600. This does not mean that a pointing angle is assigned to the onboard maintenance event 630 unless it is appropriate to do so. The horizontal length of the events in the graph can represent acceptable start times for the particular event. For example, image collection event 610a can have a defined duration corresponding to a time that the imaging satellite is over a targeted region on the Earth.

To construct a single graph 600, the scheduling module 104 can divide events into groups, where each group is represented by a different graph 600. To divide the groups, the scheduling module 104 can find gaps between events where consecutive events are not pair-wise constrained. For example, for a constellation of imaging satellites, the scheduling module 104 can collect all events to be performed over a week's time. For these events groups of events can be created where a division between one group and the next is defined as where the first event in one group is more than two minutes after last event in the predecessor group. Two minutes is used as an example of a maximum time for an imaging satellite to slew 180 degrees. This number may change under differing circumstances.

Figure 7:
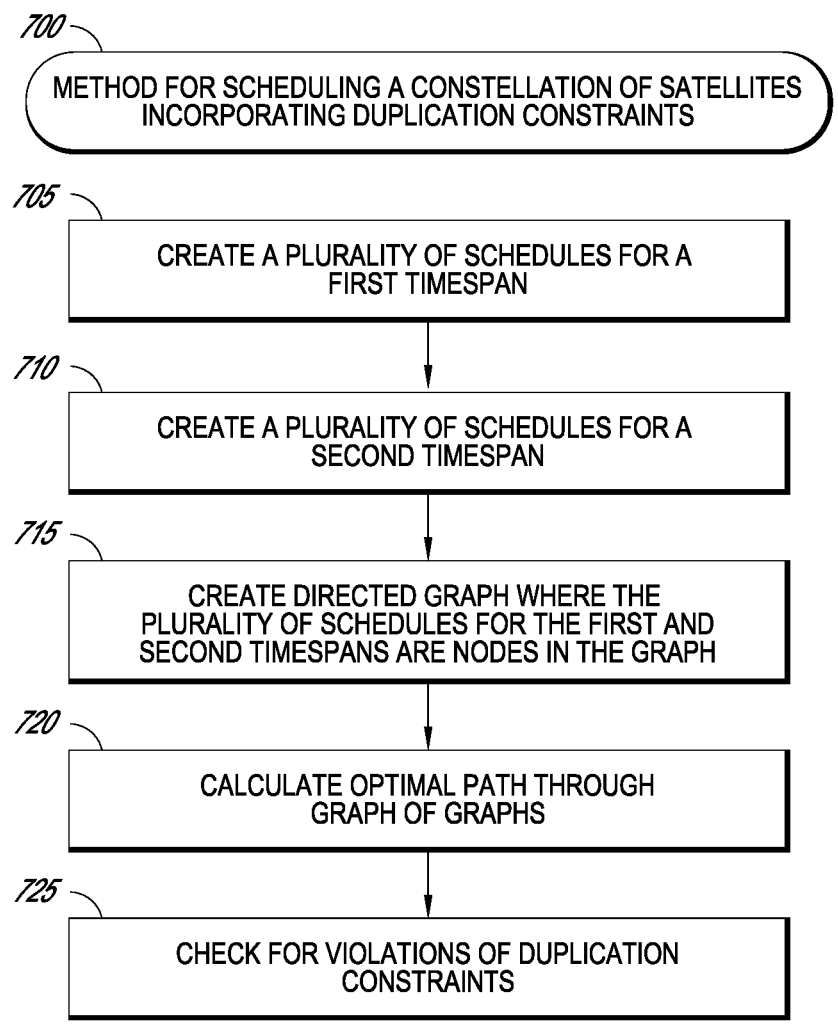
FIG. 7 illustrates a flow chart of an embodiment of a method for finding near-optimal schedules of events for a constellation of satellites subject to duplication constraints.
Figure 8:
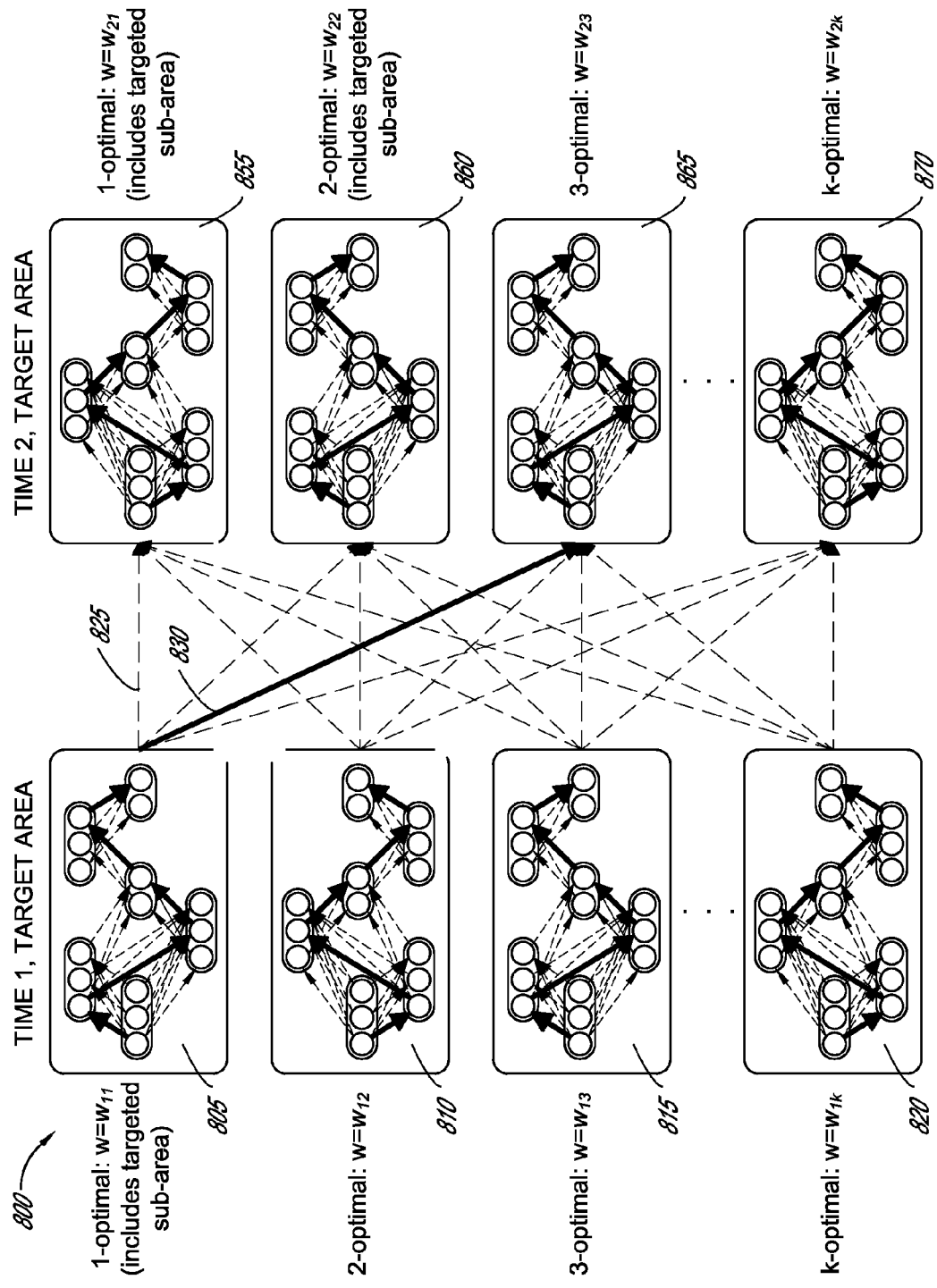
FIG. 8 illustrates an example graph of graphs showing a path through the graphs which increases utilization while avoiding undesirable duplication of events.

Example Embodiment of a System for Scheduling a Constellation of Imaging Satellites FIG. 7 illustrates a flow of an example embodiment of a method 700 for finding near-optimal schedules of events for a constellation of satellites subject to duplication constraints. The method 700 includes creating a graph of graphs, finding an optimized path through the graph of graphs, and checking whether the optimized path violates duplication constraints. Duplication constraints can be limits on the number of times a certain event occurs over a particular timespan or within a constellation of satellites. For ease of description, the blocks in the method will be described as being performed by the scheduling module 104. Blocks in the method 700, however, can be performed by various systems or modules or combination thereof. In addition, throughout the description reference will be made to an example graph of graphs 800 as illustrated in FIG. 8.

In block 705, the scheduling module 104 creates a plurality of schedules for a first timespan. The plurality of schedules for the first timespan can be created using methods described herein, particularly the method 500 described herein with specific reference to FIG. 5. In addition to finding an optimal or near-optimal path as described herein, the scheduling module 104 can create multiple schedules having different values for a utilization function. In some embodiments, the scheduling module 104 finds the k most optimal paths through a particular graph, where k is an integer number greater than or equal to 1. The graphs can be ordered according to the value of the utilization function of that graph. For example, the graph with the highest-valued utilization function can be referred to as the 1-optimal schedule, the next highest-valued graph can be referred to as the 2-optimal schedule, and so on until the k-optimal schedule. Referring to FIG. 8, the graphs on the left-hand-side represent the k-optimal schedules as determined by the scheduling module 104. Each graph has a value associated with it, w, representing the value of the utilization function for that graph. For example, the 1-optimal graph has a value $w_{11}$ associated with it, the 2-optimal graph has a value $W_{12}$ associated with it, down to the k-optimal graph which has a value $w_{1k}$ associated with it, where $w_{11}$ is greater than or equal to $w_{12}$, $w_{12}$ is greater than or equal to $w_{13}$, and so on.

In block 710, the scheduling module 104 creates a plurality of schedules for a second timespan. The schedules from the second timespan can be created in parallel with the schedules from the first timespan and in parallel with each other.

In block 715, the scheduling module 104 creates a directed graph where schedules from the first and second timespan are nodes in the directed graph. The scheduling module 104 can connect the nodes with edges originating in graphs from the first timespan and terminating in graphs of the second timespan. In some embodiments, more than two timespans are used. The scheduling module 104 can repeat the procedure of finding schedules for a particular timespan and adding those schedules to the graph of graphs.

In block 720, the scheduling module 104 calculates an optimal path through the graph of graphs. Calculating the optimal path can include finding a path through the graph of graphs that maximizes the sum of the utilization scores of the individual graphs (e.g., $w_{ij}$). This procedure can be similar to procedures described herein, particularly as described with reference to FIG. 5.

In block 725, the scheduling module 104 checks for violations of duplication constraints. Duplication constraints can include limitations on a number of times an event appears in a schedule for a constellation of satellites or over defined timespans. For example, an imaging satellite can be tasked with collecting imagery of a targeted sub-area when it is over a targeted area. An imaging satellite can be over the targeted area at time 1 and at time 2, or different imaging satellites can be over the targeted area at time 1 and time 2. For each of time 1 and time 2, schedules are created for the imaging satellite(s) using methods described herein. It may be that the schedules produced for those timespans include collecting imagery of the targeted sub-area. However, taking duplicate imagery may not be a desirable use of the imaging satellite as it could be acquiring imagery of another location. In this example, a duplication constraint can be created that restricts the number of times imagery is collected for the targeted sub-area. Thus, the scheduling module 104 can check that the optimal path through the graph of graphs found in block 720 does not violate any duplication constraints.

In some embodiments, duplication constraints can be resolved by including sub-optimal schedules in the graph of graphs, as described above. For example, in FIG. 8 the 1-optimal graph 805 in time 1 includes an event to collect imagery of a targeted sub-area. The 1-optimal graph 855 and 2-optimal graph 860 in time 2 include events to collect imagery of the targeted sub-area as well. Therefore, to avoid violating a duplication constraint that limits the collection of imagery of the targeted sub-area to 1, the scheduling module 104 creates a schedule that connects 1-optimal graph 805 in time 1 to 3-optimal graph 865 in time 2, indicated by solid arrow 830.

In some implementations, the algorithm used to find the optimal path through the graph of graphs subject to duplication constraints can be represented as follows:

```
for i ∈ in-edges_j do
    if dist_i + w_{ij} > dist_j then
        if s_j ∩ S_i = Ø then
            dist_j ← dist_i + w_{ij}
            prev_j ← i
            S_j ← s_j ∪ S_i
        end if
    end if
end for
``` where, similar to the algorithm described above in reference to FIG. 5, optimization is achieved by looping through nodes and for each node, j, choosing the longest incoming cumulative path, $dist_j$. Here, the nodes are individual schedules or graphs. The set in-edges$_j$ is all the nodes that have edges originating in a different node and terminating in node j. This set is the closed set of nodes from which a predecessor node (prev$_j$) will be chosen for node j. The weights, $w_{ij}$, represent the overall score of the schedule of the node that is the destination of the edge (e.g., $w_{ij}$ is the score of schedule $s_j$). The nodes, j, have the property, $s_j$, representing all the events that are included in the schedule represented by node j. The overall schedule up to and through node j is represented by $S_j$. In this formulation, the algorithm will string together the most optimal schedules while making sure to not repeat any events. This can be adjusted to allow for certain events to be duplicated, or allow duplication of events up to a defined number of repetitions. For example, to collect imagery over a region that is typically covered by clouds, duplication constraints can be set to allow multiple image collection events to be scheduled over that region to increase a probability that a satellite can acquire an image with a desired lack of cloud coverage. One result of this algorithm may be that locally sub-optimal schedules can be chosen to create a globally optimal schedule.

FIG. 8 illustrates an example graph of graphs 800 showing a path through the graphs which increases utilization while avoiding undesirable duplication of events. The graph of graphs 800 includes 1-optimal graph 805 for an imaging satellite during a first timespan over a targeted area which represents the optimal schedule for a first timespan as determined by the scheduling module 104. The 1-optimal graph 805 includes a schedule of events that includes collecting imagery of a targeted sub-area. The graph of graphs 800 includes sub-optimal graphs 810, 815, and 820 for the first timespan, where the sub-optimal graphs do not include an event to collect imagery of the targeted sub-area. The graph of graphs includes 1-optimal graph 855 and 2-optimal graph 860 for the imaging satellite (or a different imaging satellite) in a second timespan over the targeted area. The graphs 855 and 860 include events to collect imagery of the targeted sub-area. The graph of graphs 800 includes sub-optimal graphs 865 and 870 which do not include events to collect imagery of the targeted sub-area. Graphs from the first timespan are connected to graphs from the second timespan with edges 825. The optimal path that does not violate a duplication constraint dictating that imagery be collected once for the targeted sub-area is represented by the thick arrow pointing from 1-optimal graph 805 to 3-optimal graph 865. Each graph in the graph of graphs 800 includes a weight factor, $w_{ij}$, representing a utilization value based at least in part on the associated schedule. Finding the optimal path through the graph of graphs 800 can include maximizing the sum of the weights, $w_{ij}$, without violating duplication constraints.

Figure 9:
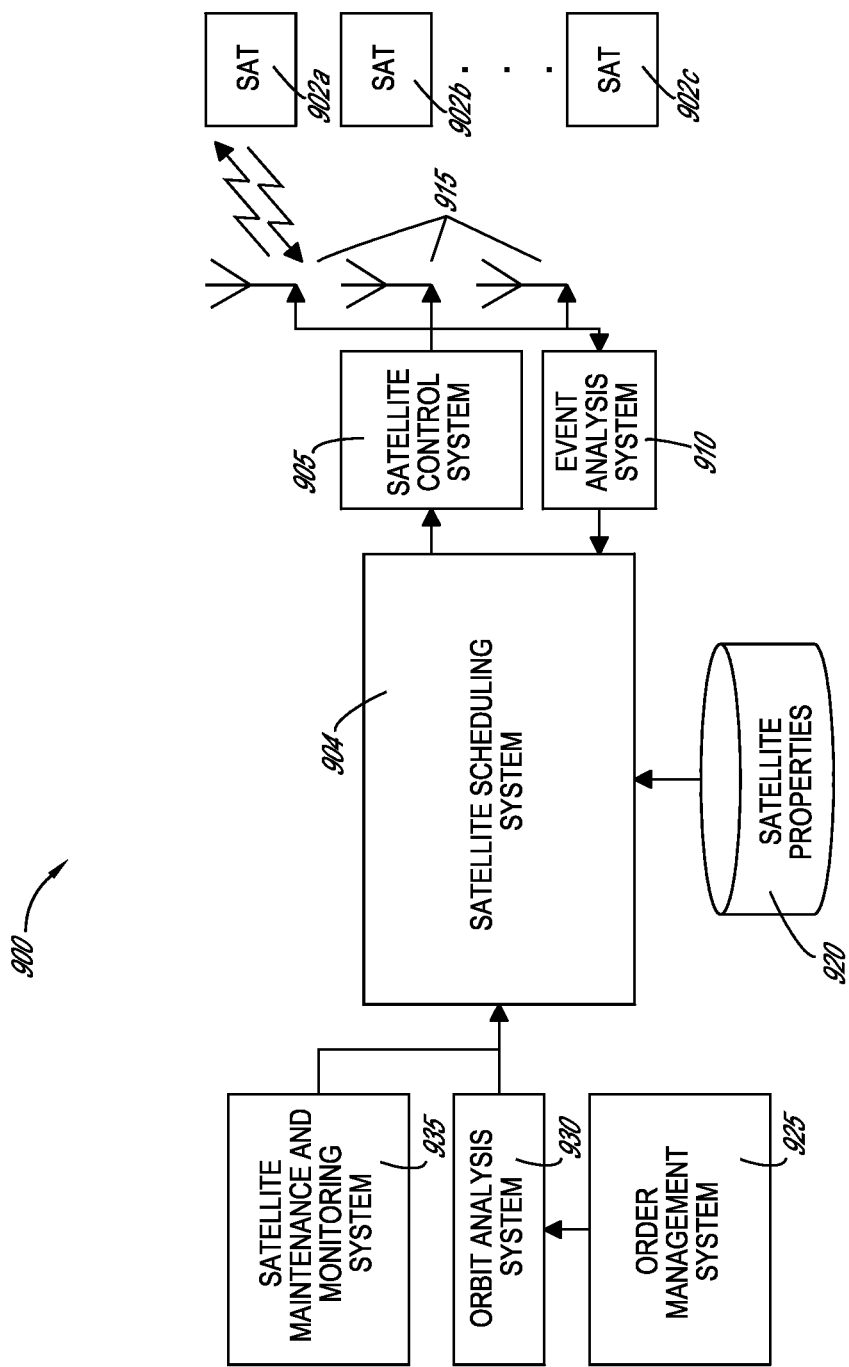
FIG. 9 illustrates a block diagram of an example system for scheduling a constellation of imaging satellites.

FIG. 9 illustrates a block diagram of an example system 900 for scheduling a constellation of satellites. The system 900 can receive orders from an order management system 925, analyze satellite schedules and satellite properties, and calculate a schedule using the satellite scheduling system 904 wherein the schedule is communicated to the satellites 902a, 902b, and 902c through a satellite control system 905 coupled to antennas 915.

The system 900 includes the order management system 925 configured to process event requests from control personnel, customers, external systems, remote systems, local systems, and the like. For example, the order management system 925 can be configured to receive orders for imagery collection from customers where an order can include desired parameters for the collection including geographic region, time frame, cloud cover, number of images, and the like. The order management system 925 can assign a priority value to the requested event for use in the satellite scheduling system 904. The order management system 925 can indicate that a requested event is critical so that the satellite scheduling system 904 can force the event to be included in any produced schedule. The order management system 925 can process received requests and transmit the processed requests to the orbit analysis system 930. The orbit analysis system 930 can analyze the various orbits of the satellites 902a, 902b, and 902c in the constellation to determine which satellites will be in the correct location to fulfill the request. This information can be transmitted to the satellite scheduling system.

The system 900 includes a satellite maintenance and monitoring system 935 configured to request maintenance or diagnostic events. These events can be regularly scheduled, requested upon satisfaction of defined criteria, or requested by a user through the maintenance and monitoring system 935. The maintenance and monitoring system 935 can transmit requests for onboard maintenance events to the satellite scheduling system 904. The transmitted events can include information about preferred pointing angle during the event, duration of the event, starting time of the event, other pertinent parameters, or any combination of these. The satellite maintenance and monitoring system 935 can indicate that an onboard maintenance event is critical so that the satellite scheduling system 904 can force the event to be included in any produced schedule.

The system 900 includes a satellite properties database 920 configured to satellite property information to the satellite scheduling system 904. Satellite properties stored in the database 920 can include information about constraints, such as agility constraints, temperature constraints, data storage constraints, energy constraints, duplication constraints, or any combination of these. The information about constraints can include operational limits and functions used to calculate the value of a parameter given a particular event. The satellite scheduling system 904 can retrieve information about satellites 902a, 902b, and 902c from the database 920 to produce optimal or near-optimal schedules for the constellation of satellites.

The system 900 includes satellite scheduling system 904 configured to find optimal or near-optimal schedules for a constellation of satellites given a list of requested events and satellite properties. The satellite scheduling system 904 can be a module similar to the scheduling module 104 and can incorporate similar components as described herein with reference to FIGS. 2-4. The satellite scheduling system 904 can employ any method described herein for producing optimal or near-optimal schedules, such as the example methods 500 and 700 described herein with reference to FIGS. 5 and 7. Additionally or alternatively, the satellite scheduling system 904 can employ any method described herein for using crowd-sourced data, such as the example methods 1100 and 1200 described herein with reference to FIGS. 11 and 12. In some embodiments, the satellite scheduling system 904 can achieve a schedule that is sufficiently close to the optimal solution using the methods described herein. In some embodiments, the satellite scheduling system 904 can produce near-optimal schedules using a directed graph-based approach about an order of magnitude faster than if it were to employ non-graph-based techniques. The satellite scheduling system 904 can be configured to compute a new schedule for one or more satellites 902a, 902b, and 902c upon receiving a new event request, updated constraints, or updated priority information.

The satellite scheduling system 904 can communicate schedule information to the satellite control system 905. The satellite control system 905 can convert the schedule information to control instructions which can be transmitted through antennas 915 to the appropriate satellite in the constellation, where the constellation can comprise one or more satellites, e.g., SAT-1 902a, SAT-2 902b, through SAT-N 902c. The satellite control system 905 can be a distinct system from the satellite scheduling system 904 and can be a remote system relative to the scheduling system 904.

The system 900 can include an event analysis system 910 to provide feedback about executed or missed events from the satellites 902a, 902b, and 902c. The satellite scheduling system 904 can receive this feedback from the event analysis system 910 and produce updated schedules based at least in part on this information.

Examples of Overhead Image Requests Using Crowd-Sourced Data

Examples of a satellite scheduling system are provided that can use crowd-sourced data to generate image acquisition events for a network of imaging satellites. A crowd-sourcing system may utilize crowd-sourced data (e.g., messages generated by users of social network services) to determine events of interest and geographic locations of such events. Event data may then be used to create or update image acquisition tasks and/or task priorities which are automatically provided to a scheduling system to facilitate timely and responsive acquisition of overhead images of the geographic location of the event. In various embodiments, the systems and methods described above with reference to FIGS. 1-9 can use crowd-sourced data by implementing the techniques and systems described below.

From humanitarian relief to disaster response and media event reporting, timely overhead imagery can be valuable in providing insight into what is actually occurring at such events. Capturing overhead imagery of these events in an agile and responsive way may be facilitated by knowledge of these events as soon as they begin and/or as they continue to unfold. Traditional methods for detecting these events and updating the data collection plans for the overhead imagery assets generally involve acquiring information from news media outlets and manually creating image acquisition requests based upon that information.

In some embodiments, scheduling overhead image acquisition is based at least in part on data accessed, aggregated, and analyzed from user-generated social network messages and/or real-time news feeds. The systems and methods used to schedule overhead image acquisition can include a machine-to-machine interface to facilitate timely image collection requests and/or reduce or eliminate human input or review to produce such requests. Social network messages and/or real-time news feeds provide a set of source data that may be timelier, more accurate, and more global than traditional media reporting or similar event- and location-centric information streams, which can enable acquisition of more valuable overhead images in response. By aggregating and/or analyzing the data streams produced by these social networks and news feeds, the systems and methods described herein may quickly and repeatedly produce overhead image acquisition tasks correlated with events of interest occurring around the world. For example, the systems and methods can provide information to be used by overhead imaging platforms (e.g., satellites, mini-satellites, or other types of overhead airborne vehicles such as airplanes or drones) so that the imaging platforms can schedule and/or obtain overhead imagery of locations (e.g., terrestrial locations or astronomical locations) where events of interest may be occurring.

To produce prompt and responsive image acquisition requests, an overhead image acquisition scheduling system can be configured to receive requests from a crowd-sourcing system which analyzes crowd-sourced data. Crowd-sourced data can include, for example and without limitation, streams of information generated by users of social networks and/or published or posted on news feeds, websites, or web logs ("blogs"). Crowd-sourced data may also include, without limitation, data from social networks and news streams, including FACEBOOK™, TWITTER™, REDDIT™, news headline feeds, micro-blogging services, data and information based on user-generated messages, and/or other data sources which are updated in near-real time. Streams of information can include textual data, metadata, image data, video data, Global Positioning System (GPS) data, geo-referenced data, and the like. Crowd-sourced data can include data uploaded to websites by members or account holders of that website as opposed to the owners or operators of the website, or so-called user-generated content. For example, a website can provide infrastructure and tools for users to use to be able to generate content, post that content for either the public to view or a selected group of people to view, and to view the content of others and provide feedback on the posted content. In this way, a community of users can exchange ideas and discourse on a variety of topics where the users themselves provide the content being discussed and exchanged.

The crowd-sourcing system can analyze crowd-sourced data to determine events of interest occurring in real-time or near real-time. Generally, determining events of interest and scheduling an image acquisition task can take hours or days. The crowd-sourcing system, however, can be configured to generate an image acquisition request in less than an hour, in less than 10 minutes, in less than 2 minutes, in less than 1 minute, or in less than 30 seconds. Events of interest may be identified through recognition of trends in the crowd-source data. Trends can be recognized through analysis of the streams of information which can include, for example, "tags" which users can employ to categorize, identify, or associate their messages with ideas or events. One such example is the social network micro-blogging service TWITTER™ which offers a "hashtag" feature by which users can provide one or more tags for their messages (e.g., tweets, status updates, etc.). Often, these hashtags can be related to events of interest (e.g., "#Olympics", "#earthquake", "#Rebellion," "#tornado", "#SolarEclipse", "#asteroid", or "#LunarLanding").

The crowd-sourcing system can analyze the crowd-sourced data to determine locations of interest in real-time or near real-time. The crowd-sourcing system can generate image acquisition requests based at least in part on its analysis of the crowd-sourced data. The requests can include, for example and without limitation, the location of interest, a window of time during which an image should be acquired, a priority associated with the request, and an indicator of why the request is being made (e.g., social networking trends indicate this image would be of interest). The location may be, for example, a geographic location corresponding to an event of interest. The location may also be, in some instances, another type of location, such as an astronomical location corresponding to an astronomical event of interest (e.g., a comet or asteroid passing near Earth, a lunar or solar eclipse, a solar storm, a lunar or planetary landing, and so on).

In some implementations, the analyzed data may then be used in conjunction with a scheduling system to generate an image acquisition task. The image acquisition task can be associated with an overhead image collection system or machine (e.g., a satellite, an imaging micro-satellite, aircraft, drone, and the like) to timely capture overhead images corresponding to events or locations of interest. For example, the crowd-sourcing system may determine a particular event has a high relative importance and send a request to the scheduling system to schedule an acquisition of overhead images corresponding to the particular event and/or location. The request may include an indication of a relative priority of the task. For example, the crowd-sourcing system can analyze crowd-sourced data to determine that an event of interest (e.g., a social uprising) has started and/or is occurring in real-time and to localize the event through the content of messages and/or tags associated with the event. The crowd-sourcing system can then generate an image acquisition request which provides the geographic location of the event of interest and an indication that a collection of overhead images of the geographic location should receive high priority. The scheduling system can then process that information to schedule an image acquisition task that results in timely and responsive captured imagery.

In some embodiments, the crowd-sourcing system can be used in conjunction with a constellation 10 of imaging micro-satellites 12, as described herein with reference to FIG. 1. The crowd-sourcing system can be directly communicably coupled to a scheduling system (e.g., the control systems 14, 100, the scheduling module 104, or the system 900) that is configured to generate a schedule of events and/or tasks for one or more of the imaging micro-satellites 12 in the constellation 10. Due at least in part to the low-earth orbits of the satellites 12 and the frequency with which at least one of the micro-satellites in the constellation is positioned to acquire imagery of a certain portion of the earth, the system 10 can acquire timely and responsive images of almost anywhere on the planet within relatively short time frames. As described in greater detail herein, the scheduling system can be configured to generate quick and near-optimal event/task schedules for the satellites in the constellation 10 (e.g., for example using implementations of the methods 500 and 700). Moreover, the crowd-sourcing system can analyze crowd-source data to identify and locate events of interest in near-real time. Through a machine-to-machine interface between the crowd-sourcing system and the scheduling system, quick and responsive tasks can be created for the constellation 10 of satellites 12 which includes image acquisition events based on crowd-sourced data. This can allow for a reduction in or elimination of human interaction with the scheduling system and/or the control system to acquire images of events of interest. As a result, the constellation 10 of imaging micro-satellites 12 can be automated to acquire images requested by operators or customers as well as acquiring images of events of interest which were not requested by a customer or operator but which were the result of analysis of crowd-sourced data.

Example Crowd-Sourcing System

Figure 10:
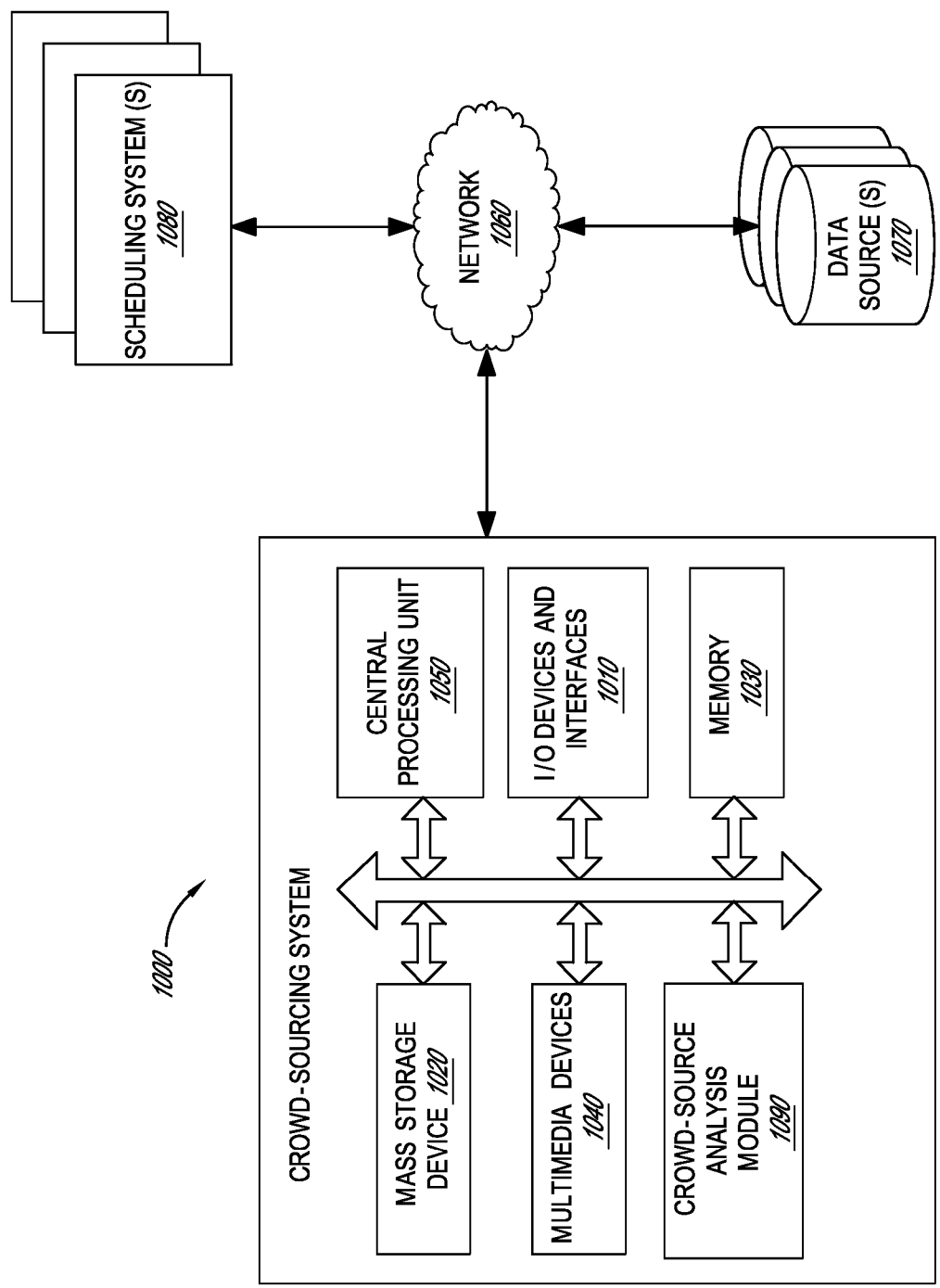
FIG. 10 illustrates a block diagram of an example crowd-sourcing system configured to use crowd-sourced data for scheduling overhead image acquisition tasks.

FIG. 10 illustrates an example configuration of a crowd-sourcing system 1000 in communication with scheduling system(s) 1080 and data source(s) 1070. The crowd-sourcing system 1000 may be configured to provide the features described herein, including but not limited to analyzing crowd-sourced data (for example, data accessed from data source(s) 1070) in order to coordinate image acquisition via the scheduling system(s) 1080. The scheduling system(s) 1080 can include any of the scheduling systems disclosed herein such as, e.g., the control systems 14, 100, the system 900, and/or the scheduling module 104. In some embodiments, the crowd-sourcing system 1000, scheduling system(s) 1080, and/or data source(s) 1070 may be components of a single system such as, e.g., the control systems 14, 100, the system 900, and/or the scheduling module 104. Thus, in some implementations, crowd-sourced data can be used at least partly in determining the schedules of the satellites 12 in the constellation 10 of satellites shown in FIG. 1. In some embodiments, other systems for acquiring overhead images using crowd-sourced data, as described herein, may include additional or fewer components than are illustrated in the example of FIG. 10.

The crowd-sourcing system 1000 can be communicably coupled via a machine-to-machine interface to the scheduling system(s) 1080 for communication between the systems. In some embodiments, the crowd-sourcing system 1000 can communicate with the scheduling system(s) 1080 without intervening input from a human so that image acquisition requests from the crowd-sourcing system 1000 can be provided in near real-time to the scheduling system(s) 1080 to result in timely and responsive image acquisition tasks. In some embodiments, the scheduling system(s) 1080 are communicably coupled to a control system for a constellation of satellites. In some embodiments, the scheduling system(s) 1080 are communicably coupled to other image acquisition devices or systems and/or to their corresponding control systems. In some embodiments, the scheduling system(s) 1080 are configured to produce output for operator review before any schedule is actually created.

The scheduling system(s) 1080 can be configured to generate image acquisition tasks based on any suitable scheduling algorithm. For example, the scheduling system(s) 1080 can be configured to optimize one or more utilization parameters such that associated imaging systems are maximally or optimally used. As another example, the scheduling system(s) 1080 can employ an algorithm which generates tasks based at least in part on the order in which requests are received. As another example, the scheduling system(s) 1080 can generate schedules based at least in part on a priority associated with a request (e.g., an event is scheduled before another event if it has a higher priority). The scheduling system(s) 1080 can be configured to analyze priority information, location information, time information, and the like associated with an image acquisition request to determine a suitable, appropriate, or desirable schedule for the requested image acquisition.

In some embodiments, the scheduling system(s) 1080 are the scheduling systems, scheduling modules, and/or control systems described herein with reference to FIGS. 1-9. The algorithms employed by such scheduling system(s) 1080 can be those described herein which are configured to produce near-optimal schedules of tasks in relatively short time or near real-time, e.g., embodiments of the methods 500 and 700 described with reference to FIGS. 5 and 7. In this way, the combination of the crowd-sourcing system 1000 and the scheduling system(s) 1080 can be configured to be quick and agile in producing image acquisition events associated with events or locations of interest in near real-time.

In the example embodiment of FIG. 10, the crowd-sourcing system 1000 also includes a crowd-source analysis module 1090 that may be stored in the mass storage device 1020 as executable software codes that are executed by the CPU 1050. The crowd-sourcing module 1090 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The crowd-sourcing system 1000 can be configured to execute the crowd-source analysis module 1090 to analyze data retrieved and/or received from data source(s) 1070 to determine events of interest, correlate those events with geographic or geo-location information about where the events are occurring or have occurred, and create image acquisition requests for the scheduling system(s) 1080 to generate an image acquisition event corresponding to the events and/or the geographic locations of the events. In some embodiments, the crowd-source analysis module 1090 is configured to perform one or more blocks in the example methods described herein with reference to FIGS. 11 and 12 including, without limitation, determining events of interest based at least in part on crowd-sourced data, localizing events of interest from the crowd-sourced data, determining a degree of relevance for events of interest, creating image acquisition requests, localizing crowd-sourced data, correlating localized data, sorting correlated data, and/or providing image acquisition requests to the scheduling systems 1080.

The crowd-sourcing system 1000 can include, for example, a personal computer that is compatible with IBM, Macintosh, or Linux/Unix or a server or workstation. In one embodiment, the crowd-sourcing system 1000 comprises a server, a laptop computer, a cell phone, a personal digital assistant, a kiosk, or a distributed computing system, for example and without limitation. In one embodiment, the overhead image acquisition system 1000 includes one or more central processing units ("CPUs") 1050, which may each include a conventional or proprietary microprocessor. The crowd-sourcing system 1000 further includes one or more memory 1030, such as random access memory ("RAM") for temporary storage of information, one or more read only memory ("ROM") for permanent storage of information, and one or more mass storage device 1020 (illustrated as user storing user account data in the illustrated embodiment), such as a hard drive, diskette, solid state drive, or optical media storage device. Typically, components of the crowd-sourcing system 1000 are connected to the computer using a standard based bus system. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of the crowd-sourcing system 1000 may be combined into fewer components and modules or further separated into additional components and modules. In some embodiments, the crowd-sourcing system 1000 comprises multiple computers communicating with one another. In some embodiments, the crowd-sourcing system 1000 is part of a satellite control system, such as the control systems described herein with reference to FIGS. 1-4 and 9.

The crowd-sourcing system 1000 can generally be controlled and coordinated by operating system software, such as Windows XP, Windows Vista, Windows 7, Windows Server, Unix, Linux, SunOS, Solaris, Android, iOS, Mac OS, or other compatible operating systems. In some embodiments, the crowd-sourcing system 1000 may be controlled by a proprietary or custom operating system. Conventional operating systems control and schedule computer processes for execution, perform memory management, provide file system, networking, I/O services, and provide a user interface, such as a graphical user interface ("GUI"), among other things.

The crowd-sourcing system 1000 may include one or more commonly available input/output (I/O) devices and interfaces 1010, such as a keyboard, mouse, touchpad, touchscreen, and printer. In one embodiment, the I/O devices and interfaces 1010 include one or more display devices, such as a monitor, that allows the visual presentation of data to a user. More particularly, a display device provides for the presentation of GUIs, application software data, and multimedia presentations, for example. The crowd-sourcing system 1000 may also include one or more multimedia devices 1040, such as speakers, video cards, graphics accelerators, and microphones, for example.

In some embodiments, the crowd-sourcing system 1000 may be utilized without any I/O devices configured to directly receive input from a user or operator. In such embodiments, the crowd-sourcing system 1000 can be configured to run autonomously and/or to be administered through remote connections. This can allow for the system 1000 to run with little or no user interaction, thereby emphasizing the automated nature of the interactions between the crowd-sourcing system 1000 and the scheduling system(s) 1080.

In the example embodiment of FIG. 10, the crowd-sourcing system 1000 is communicably coupled to a network 1060, which comprises one or more of a LAN, WAN, and/or the Internet, for example, via a wired, wireless, or combination of wired and wireless, communication link. The network 1060 communicates with various computing devices and/or other electronic devices via wired or wireless communication links. In the example embodiment illustrated in FIG. 10, the crowd-sourcing system 1000 is coupled to the scheduling system(s) 1080 through the network 1060, but the crowd-sourcing system 1000 can also be directly communicably coupled to the scheduling system(s) 1080 (e.g., not through a network) and/or the crowd-sourcing system 1000 can be a part of the scheduling system(s) 1080.

Information can be provided to the crowd-sourcing system 1000 over the network 1060 from one or more data source(s) 1070. The data sources 1070 may include one or more internal and/or external data sources. The data sources 1070 may include, for example, social network services and/or messages, status updates, news aggregators, and other data sources providing access to real-time or near real-time information related to news, events, and the like. The crowd-sourcing system 1000 can be configured to access crowd-sourced data stored in the data source(s) 1070 where the crowd-sourced data is aggregated into the data source(s) 1070, accessed from its source website (e.g., by scraping the website or using application programming interfaces ("APIs") associated with the website), or a combination of both crowd-sourced data aggregators and direct website access. In some embodiments, one or more of the databases or data sources 1070 may be implemented using a relational database, such as Sybase, Oracle, CodeBase and Microsoft® SQL Server as well as other types of databases such as, for example, a flat file database, an entity-relationship database, and object-oriented database, and/or a record-based database.

Example of Method of Requesting Image Acquisition Using Crowd-Sourced Data

Figure 11:
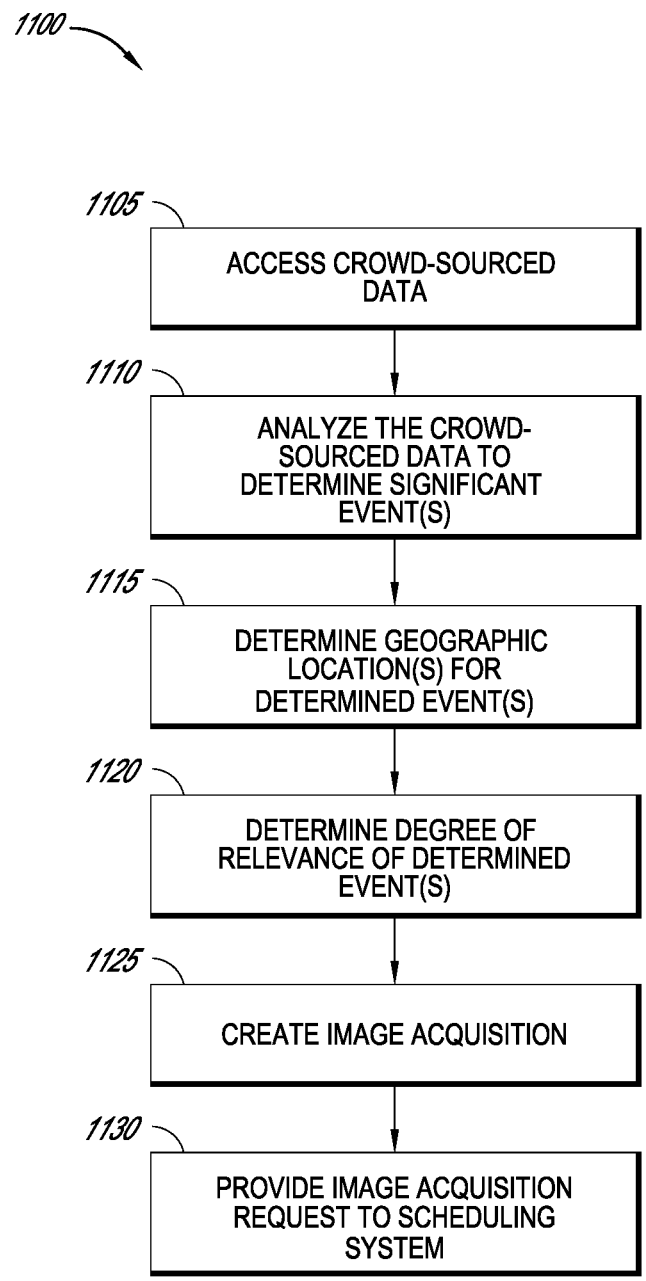
FIG. 11 illustrates a flow chart of an example method for analyzing crowd-sourced data for use in scheduling overhead image acquisition tasks.

FIG. 11 schematically illustrates an example process 1100 that may be implemented by an overhead image task system to determine overhead image acquisition tasks and/or targets using crowd-sourced data. In some implementations, the process 1100 may be performed by embodiments of the crowd-sourcing system 1000 described with reference to FIG. 10 or by one of its components, such as the crowd-source analysis module 1090. For ease of explanation, the following describes the services as performed by the crowd-sourcing system 1000. The example scenarios are intended to illustrate, but not to limit, various aspects of the crowd-sourcing system 1000.

Beginning at block 1105 of FIG. 11, the crowd-sourcing system 1000 accesses crowd-sourced data related to events. The crowd-sourced data may be accessed for example from the data sources 1070. At block 1110, the crowd-sourcing system 1000, for example via the crowd-source analysis module 1090, analyzes the crowd-sourced data to determine events that may be of interest or social significance. The analysis may be based at least in part, for example, on semantic analysis of user-generated messages (including message text, "tags," other metadata associated with the messages, images, video, and/or GPS or other location information). Analysis may be performed by generating statistics and/or aggregate data to determine trends in messages and/or topics related to events. Events of interest may, for example, correspond to an increased number of messages and/or increased use of certain tags related to the event. An increased number of messages can, for example, be determined by finding a number of messages (or messages per unit time) that are above a threshold number. The threshold may be a number (or number per unit time) representative of an average number (or number per unit time) of messages. Thus, for example, a threshold may be 110%, 120%, 150%, 200% (or some other percentage) of the average. The threshold may be selected to be large enough that routine hourly, daily, or seasonal fluctuations in the message number or message rate do not trigger a statistical fluctuation as a socially significant event.

To determine events of interest, in some embodiments, the crowd-sourcing system 1000 can search for keywords in the crowd-sourced data. Keywords can be selected which are related to events of interest in general, such as earthquake, hurricane, Superbowl, World Cup, floods, riots, war, etc. Keywords can be selected which represent a narrower interest which may be valuable to a selected subset or portion of the population, such as a name of a city, a local event, a business name, or the like. Any surge in frequency in the use of the keyword(s) in the crowd-sourced data can be interpreted to signify an event of interest.

In certain embodiments, the crowd-sourcing system 1000 can analyze crowd-sourced data for geographic concentration. For example, if the same or related tags or keywords are being used more frequently in a geographic location than usual or more frequently than in surrounding areas or similar geographic areas (e.g., cities of a similar size, culturally similar locations, etc.), that can be interpreted as indicating an event of interest in that geographic area.

In various embodiments, the crowd-sourcing system 1000 can track data provided by users or entities which may be considered to be influential or significant. The information provided by these individuals or entities can be treated as more significant than information provided by other users or entities. This can be represented as a weighting factor assigned to data obtained from such entities. Similarly, information provided from some websites or services can receive a greater weight than other sources. The weighting can be adjustable and assigned based on influence, trustworthiness, interest, and the like. Information obtained from analysis of the crowd-sourced data can be used to inform assignment of weighting factors. For example, if an individual is being mentioned frequently on social networks, information provided by that individual can receive a greater weight as a function of the frequency of mentions.

In some embodiments, the crowd-sourcing system 1000 can use information from selected sources to provide seeds for identifying events of interest. For example, news providers can be monitored to generate a dictionary of keywords and/or locations of potential interest. The crowd-sourced data can then be analyzed with a focus on the dictionary of keywords and/or locations to identify events of interest.

At block 1115, the crowd-sourcing system 1000 determines the geographic location(s) for the determined event(s) of interest or social significance. The determination may be based at least in part, for example, on localizing the events of interest by analyzing statistically significant anomalies in geographic tagging trends. Event(s) of interest can include events that have significance to a broad community of persons (e.g., events such as environmental disasters (natural or man-made), political or military uprisings, etc.). However, events of interest are not limited to such types of events. Accordingly, an event of interest should be construed broadly to include, without limitation, any type of event having social, humanitarian, cultural, economic, political, military, financial, environmental, scientific, or medical impact or concern. Such events may impact or concern a wide range of persons (e.g., a nation-wide disaster or revolution) or a relatively small number of persons (e.g., a flood of a canal in a neighborhood). Such events may impact or concern entities such as governmental entities, non-governmental entities (e.g., non-governmental organizations or NGOs), business entities (e.g., corporations), or any other type of public or non-public organization or group. For example, an event of interest can include a cave-in at an abandoned mine on private property owned by a mining company (e.g., such an event is of interest to the mining company).

In some embodiments, the crowd-sourcing system 1000 can determine the geographic location for an event of interest by analyzing the syntax of the crowd-sourced data to identify language associated with a geographic location. For example, place names, monuments, landmarks, famous geographical features, localized slang, and the like can be monitored and identified and associated with a geographical location. If, for example, crowd-sourced data contain references to "Eiffel Tower" then the geographical location can be determined to be the location of the Eiffel Tower in Paris, France. Similarly, metadata and/or hashtags can be monitored for similar language or words associated with geographic locations.

In certain embodiments, the crowd-sourcing system 1000 can analyze geo-tags, GPS data, or other location-related information included with crowd-sourced data to determine a location of events of interest. In various embodiments, the crowd-sourcing system 1000 can perform image analysis on images in crowd-sourced data to identify geographic locations. In some embodiments, the crowd-sourcing system 1000 can identify geographic locations based at least in part on an association between a person and a location. For example, if the president of the United States is known to be in Beijing, China, then mentions of the president in crowd-sourced data can be associated with Beijing, China. Accordingly, crowd-sourced data or other data sources can be used to create associations between people and locations.

At block 1120, the crowd-sourcing system 1000 determines a degree of relevance for each of the determined event(s) of interest. The degree of relevance can be associated with a frequency of mentions in the crowd-sourced data. For example, an event may be determined to have a lower degree of relevance if the number of messages, or use of tags, related to the event is relatively low. At block 1120 socially significant events may also be ranked using techniques such as sentiment analysis to assess the relative importance and/or criticality of certain events. In some embodiments, the degree of relevance can be associated with a weighting factor associated with the event. For example, if the event of interest is associated with a current event of relatively-wide interest, such as the Olympics, the degree of relevance for the event can be greater than for flooding in a small town.

Continuing to block 1125, the crowd-sourcing system 1000 may create image acquisition requests associated with geographic locations to be targeted for overhead image acquisition. The image acquisition requests may be associated with a priority (e.g., based on the relevance and/or ranking determined at block 1120) indicating whether the image acquisition task should be scheduled in advance of other tasks (including image acquisition or maintenance tasks requested by external systems and/or, for example, previously produced by scheduling system(s) 1080).

At block 1130, the image acquisition request(s) may be provided to a scheduling system, such as one of the scheduling system(s) 1080. The scheduling system(s) 1080 may then process the image acquisition request(s) and update and/or modify any related schedules. Described elsewhere herein are examples of producing a schedule of tasks or events after incorporation of image acquisition requests.

Example Method of Machine-to-Machine Tasking Using Crowd-Sourced Data

Figure 12:
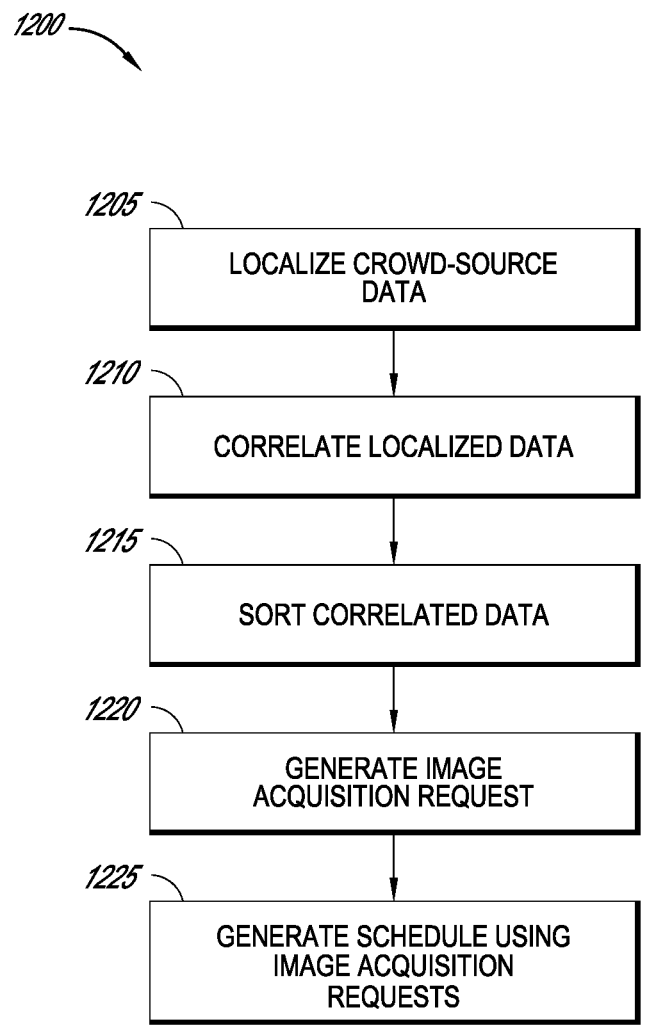
FIG. 12 illustrates a flow chart of an example method for machine-to-machine tasking using crowd-source data.

FIG. 12 illustrates a flow chart of an example method 1200 for machine-to-machine tasking using crowd-source data. By analyzing the information streams that social networks generate, events of interest can be localized by detecting statistically significant anomalies in geographic tagging trends. Additionally, these tags can be correlated using matching analysis of the text of tags and message data. Correlated events can be ranked using techniques such as sentiment analysis to assess the relative importance and criticality of events. By analyzing the data streams produced by these social networks and implementing a localize, correlate, sort, and generate task process loop, embodiments of the disclosed systems and methods can quickly and repeatedly obtain current overhead imagery of events of interest occurring around the world.

The example method 1200 includes localizing crowd-sourced data, which can include identifying a location for messages or data in the crowd-sourced data in block 1205. Determining the location associated with information in the crowd-source data can include any suitable method, such as those described herein with reference to FIG. 11.

In block 1210, the localized data can be correlated. Correlating data can include using matching analysis of the streams of information to identify related messages, tags, images, and the like. Correlated events can indicate events of interest based at least in part on methods of determining significance of events, as described elsewhere herein. Such methods can include, for example and without limitation, frequency of keywords in localized data, geographical anomalies, weighting factors, and the like.

In block 1215, the correlated events can be sorted using techniques such as sentiment analysis, semantic analysis, K-means clustering, and various machine learning techniques. Sorting the correlated events can be used to assess the relative importance and/or criticality of events.

In block 1220, image acquisition requests can be formulated based at least in part on the localized data and the sorting of the data. In block 1225, the image acquisition requests are used to generate a schedule of events for the image acquisition systems.

In some embodiments, the method 1200 can be implemented using a crowd-sourcing system and a scheduling system as described herein. These systems can be part of a larger satellite control system, as described with reference to FIGS. 1-9. As part of the satellite control system, the crowd-sourcing system and the scheduling system can include a machine-to-machine interface which allows the systems to communicate with one another without human intervention. In this way, the scheduling system can generate image acquisition events based on crowd-source data in an automated, quick, and near-real time fashion. The image acquisition events can thus be associated with a variety of events of interest occurring around the world.

Additional Examples and Embodiments

Examples of Scheduling Systems and Methods

In embodiment 1, a system for scheduling events for a constellation of imaging satellites is provided, the system comprising non-transitory data storage configured to store satellite properties information corresponding to characteristics of one or more imaging satellites in the constellation of imaging satellites. The system also includes a computing device in communication with the data storage, the computing device configured to execute: an order management system configured to produce or receive requests for an image collection event; an orbit analysis system configured to identify one or more imaging satellites in the constellation of imaging satellites which will be positioned over a region suitable to perform a requested image collection event; a maintenance system configured to produce requests for onboard maintenance for imaging satellites in the constellation of imaging satellites; a satellite scheduling system configured to receive event requests and satellite properties and to produce a near-optimal schedule of events that does not violate constraints of the constellation of imaging satellites; and a satellite control system configured to receive the near-optimal schedule of events and convert the near-optimal schedule of events to control instructions for transmission to the one or more imaging satellites in the constellation of imaging satellites.

The system of embodiment 2 includes all the elements of embodiment 1, and is further configured to use a directed acyclic graph to produce the near-optimal schedule of events.

The system of embodiment 3 includes all the elements of any of embodiments 1 or 2 and further comprises an event analysis system configured to receive information from the one or more imaging satellites, wherein the received information is related to a result of executing the control instructions transmitted to the one or more imaging satellites. The system of embodiment 4 includes all the elements of embodiment 3 and is further configured to receive event analysis information from the event analysis system and to produce an updated near-optimal schedule of events that incorporates the received event analysis information. The system of embodiment 5 includes all the elements of any of embodiments 1 to 4, wherein the order management system is further configured to assign a priority to each event request and the satellite scheduling system is configured to receive the priority associated with each event request and to use the priority associated with each event request to produce the near-optimal schedule of events. The system of embodiment 6 includes all the elements of any of embodiments 1 to 5, wherein the order management system is further configured to receive crowd-sourced data and analyze the crowd-sourced data to determine an image collection event.

In embodiment 7, a system is provided for scheduling events for a plurality of satellites, the system comprising a computing device configured to execute an event system configured to produce, store, or receive event requests; a constraints system configured to produce, store, or receive characteristics of the plurality of satellites; a prioritization system configured to produce, store, or receive priority information corresponding to the event requests; and a control system operatively coupled to the event system, the constraints system, and the prioritization system. The control system comprises a scheduling module configured to process the event requests received from the event system, the characteristics of the plurality of satellites received from the constraints system, and the priority information received from the prioritization system and to produce a near-optimal schedule of events in near real-time that does not violate constraints of the plurality of objects. The control system also comprises a command module configured to receive the near-optimal schedule of events and create control instructions for the plurality of objects based at least in part on the near-optimal schedule of events.

The system of embodiment 8 includes all the elements of embodiment 7, wherein the scheduling module is further configured to use a directed acyclic graph to produce the near-optimal schedule of events. The system of embodiment 9 includes all the elements of embodiments 7 or 8, wherein at least one event is such that all acceptable paths through the directed acyclic graph pass through the event. The system of embodiment 10 includes all the elements of any of embodiments 7 to 9, wherein the characteristics of the plurality of satellites include pair-wise constraints and cumulative constraints. The system of embodiment 11 includes all the elements of embodiment 10, wherein the cumulative constraint is one of a data capacity limitation, a power requirement, or a thermal value. The system of embodiment 12 includes all the elements of embodiment 10, wherein the pair-wise constraint is a slewing rate of a satellite. The system of embodiment 13 includes all the elements of any of embodiments 7 to 12, wherein the scheduling module is configured to produce the near-optimal schedule of events by building a sequence of events and removing a newly added event if a utilization function does not increase. The system of embodiment 14 includes all the elements of any of embodiments 7 to 13, wherein the scheduling module is produce the near-optimal schedule of events by building a sequence of events and removing a newly added event if a cumulative constraint would be violated by maintaining the newly added event in the near-optimal schedule of events. The system of embodiment 15 includes all the elements of any of embodiments 7 to 14, wherein the event system is further configured to produce an event based on crowd-sourced data. The system of embodiment 16 includes all the elements of any of embodiments 7 to 15, wherein the plurality of satellites comprises micro-satellites.

In embodiment 17, a non-transitory computer storage is provided which is configured with executable instructions for scheduling events for a plurality of satellites. The executable instructions comprise a scheduling module configured to produce a near-optimal schedule of events in near real-time by building a temporary schedule of events one event at a time and removing a newly added event from the temporary schedule if it causes a violation of a cumulative constraint. The executable instructions also comprise a command module configured to receive the near-optimal schedule of events and create control instructions for the plurality of satellites based at least in part on the near-optimal schedule of events. The near-optimal schedule of events is the temporary schedule of events which does not violate of a cumulative constraint.

The non-transitory computer storage of embodiment 18 includes all the elements of embodiment 17, wherein the near-optimal schedule of events is the temporary schedule of events which results in a higher value for a utilization function than other temporary schedules of events. The non-transitory computer storage of embodiment 19 includes all the elements of any of embodiments 17 or 18, wherein the scheduling module is configured to build the temporary schedule of events by starting with a first event and adding a second event later in time than the first event, wherein the second event is not pair-wise constrained from following the first event in the temporary schedule. The non-transitory computer storage of embodiment 20 includes all the elements of any of embodiments 17 to 19, wherein the satellite comprises an imaging satellite, and the scheduling module is further configured to analyze crowd-sourced data to determine an event of interest; determine a geographic location for the event of interest using the crowd-sourced data; and create an image acquisition request comprising the determined geographic location of the event of interest. The non-transitory computer storage of embodiment 21 includes all the elements of any of embodiments 17 to 20, further comprising a display module configured to display the near-optimal schedule of events.

In embodiment 22, a method for scheduling events for a plurality of objects is provided, the method comprising, under control of a computing device in communication with non-transitory data storage configured to store properties corresponding to characteristics of the plurality of objects, determining a likely path for each of the plurality of objects; receiving event requests and object properties for the plurality of objects; producing a near-optimal schedule of events that does not violate constraints of the plurality of objects; and converting the near-optimal schedule of events to control instructions for transmission to the plurality of objects. A first constraint of the plurality of objects is a cumulative constraint and a second constraint of the plurality of objects is a pair-wise constraint.

The method of embodiment 23 includes all the elements of embodiment 22, wherein producing the near-optimal schedule of events comprises utilizing a directed acyclic graph to determine the near-optimal schedule of events. The method of embodiment 24 includes all the elements of embodiment 22, wherein at least some of the plurality of objects comprise imaging satellites, and the cumulative constraint is one of a data capacity limitation, a power requirement, or a thermal value. The method of embodiment 25 includes all the elements of embodiment 22, wherein at least some of the plurality of objects comprise imaging satellites, and the pairwise constraint is a slewing rate of one of the imaging satellites. The method of embodiment 26 includes all the elements of embodiment 22, wherein at least some of the plurality of objects comprise a constellation of imaging satellites, and the method further comprises accessing crowd-sourced data; analyzing the crowd-sourced data to determine an event of interest; determining a geographic location for the event of interest using the crowd-sourced data; determining a degree of relevance for the event of interest; creating an image acquisition request, wherein the image acquisition request comprises the determined geographic location of the event of interest; and including the image acquisition request in the schedule of events. The method of embodiment 27 includes all the elements of any of embodiments 22 to 26, wherein method produces the near-optimal schedule of events in near real-time. The method of embodiment 28 includes all the elements of embodiment 27, wherein method produces the near-optimal schedule of events in less than about 10 minutes. The method of embodiment 29 includes all the elements of embodiment 28, wherein at least some of the plurality of objects comprise satellites.

Examples of Crowd-Sourced Scheduling Systems and Methods

In embodiment 30, a method is provided for using crowd-sourced data to automatically schedule an image acquisition event in a constellation of imaging micro-satellites. The method includes accessing crowd-sourced data; analyzing the crowd-sourced data to determine an event of interest; determining a geographic location for the event of interest using the crowd-sourced data; determining a degree of relevance for the event of interest; creating an image acquisition request, wherein the image acquisition request comprises (1) the determined geographic location of the event of interest and (2) a task priority based at least in part on the determined degree of relevance for the event of interest; and automatically providing via a machine-to-machine interface the image acquisition request to a scheduling system associated with the constellation of imaging micro-satellites, the scheduling system operable to generate an image acquisition task associated with the determined geographic location for at least one imaging micro-satellite in the constellation of imaging micro-satellites. The method is performed under control of a crowd-sourcing system comprising computing hardware.

The method of embodiment 31 includes all the elements of embodiment 30, wherein analyzing the crowd-sourced data to determine an event of interest comprises generating a list of terms from textual data within the crowd-sourced data; determining a frequency of use within the crowd-sourced data for each term in the list of terms; comparing the frequency of use for each term in the list of terms to a baseline frequency of use; and identifying an event of interest when an event-related term in the list of terms has a frequency that exceeds an interest threshold over the baseline frequency of use. The method of embodiment 32 includes all the elements of embodiment 31, wherein the interest threshold is at least 110% of the baseline frequency of use. The method of embodiment 33 includes all of the elements of any of embodiments 30 to 32, wherein analyzing the crowd-sourced data to determine an event of interest comprises searching for a list of keywords in the crowd-sourced data; determining a frequency of use of each of the keywords in the list of keywords in the crowd-sourced data; identifying an event of interest when the frequency of use of an event-related keyword exceeds a baseline threshold. The method of embodiment 34 includes all of the elements of any of embodiments 30 to 33, wherein determining the geographic location of the event of interest using the crowd-sourced data comprises identifying statistically significant anomalies in geographic tagging trends. The method of embodiment 35 includes all of the elements of any of embodiments 30 to 34, wherein determining a degree of relevance for the event of interest comprises using sentiment analysis to assess a relative importance of the event of interest. The method of embodiment 36 includes all of the elements of any of embodiments 30 to 35, wherein the method is performed in near real-time to generate the image acquisition request. The method of embodiment 37 includes all the elements of any of embodiments 30 to 36, wherein the crowd-sourced data is accessed and analyzed on a periodic basis automatically without intervening input from a user. The method of embodiment 38 includes all the elements of any of embodiments 30 to 37, wherein the event of interest is an environmental disaster, a political revolution, a social uprising, or an event having a sociocultural impact on a community. The method of embodiment 39 includes all the elements of any of embodiments 30 to 38, wherein the scheduling system utilizes a directed acyclic graph to generate the image acquisition task.

In embodiment 40, a system is provided for using crowd-sourced data to automatically generate an image acquisition request for a satellite scheduling system. The system comprises a computing device and a network input/output device configured to retrieve over a network crowd-sourced data from one or more data sources. The system also comprises a crowd-sourced data analysis module configured to use the computing device to analyze the crowd-sourced data to determine an event of interest, determine a geographic location for the event of interest using the crowd-sourced data, and create an image acquisition request comprising the determined geographic location of the event of interest and a task priority. The system also comprises a machine-to-machine interface configured to automatically provide the image acquisition request to the satellite scheduling system.

The system of embodiment 41 includes all the elements of embodiment 40, wherein the crowd-sourced data analysis module is configured to determine the geographic location by identifying statistically significant anomalies in geographic tagging trends. The system of embodiment 42 includes all the elements of any of embodiments 40 or 41, wherein the crowd-sourced data analysis module is configured to the degree of relevance by using sentiment analysis to assess a relative importance of the event of interest. The system of embodiment 43 includes all the elements any of embodiments 40 to 42, wherein the image acquisition request is created in near real-time. The system of embodiment 44 includes all the elements of any of embodiments 40 to 43, wherein the crowd-sourced data is accessed and analyzed on a periodic basis automatically without intervening input from a user.

In embodiment 45, a system is provided for scheduling events for imaging satellites. The system comprises non-transitory data storage configured to store crowd-sourced data related to events. The system also comprises a physical computing system in communication with the non-transitory data storage, the physical computing system configured to analyze the crowd-sourced data for trends indicating one or more socially significant events; determine a geographic location for each of the socially significant events; determine a degree of relevance for each of the socially significant events; create an image acquisition task, wherein the image acquisition task comprises at least (1) the determined geographic location corresponding to one or more of the socially significant events and (2) a task priority based at least in part on the determined degree of relevance for the one or more socially significant events; and provide the image acquisition task to a scheduling system associated with the imaging satellites, the scheduling system operable to generate for the imaging satellites a schedule of tasks which includes at least the image acquisition task.

The system of embodiment 46 includes all the elements of embodiment 45, and further comprises a machine-to-machine interface configured to communicate the image acquisition task to the scheduling system. The system of embodiment 47 includes all the elements of any of embodiments 45 or 46, wherein the scheduling system is configured to use a directed acyclic graph to produce the schedule of tasks. The system of embodiment 48 includes all the elements of embodiment 47, wherein at least one task is such that all acceptable paths through the directed acyclic graph pass through the task. The system of embodiment 49 includes all the elements of any of embodiments 47 or 48, wherein the scheduling system generates the schedule of tasks subject to pair-wise constraints and cumulative constraints. The system of embodiment 50 includes all the elements of embodiment 49, wherein the cumulative constraints include one of a data capacity limitation, a power requirement, or a thermal value. The system of embodiment 51 includes all the elements of embodiment 49, wherein the pair-wise constraints include a slewing rate of one of the imaging satellites. The system of embodiment 52 includes all the elements of any of embodiments 45 to 51, wherein the physical computing system is configured to create the image acquisition task in near real-time. The system of embodiment 53 includes all the elements of any of embodiments 45 to 52, wherein the crowd-sourced data is analyzed on a periodic basis automatically without intervening input from a user.

In embodiment 54, a method is provided for generating an image acquisition request, the method performed under control of a crowd-sourcing system comprising computing hardware including one or more physical processors. The method comprises analyzing crowd-sourced data to determine a location of an event of interest; ranking the event of interest; creating an image acquisition request comprising the determined location and the ranking of the event of interest; and providing via a machine-to-machine interface the image acquisition request to a scheduling system. The event of interest is determined and the image acquisition request is provided to the scheduling system without intervening input from a user.

The method of embodiment 55 includes all the elements of embodiment 54, wherein the event of interest is a political event, a social event, an environmental event, an astronomical event, or a sociocultural event having an impact on a community. The method of embodiment 56 includes all the elements of any of embodiments 54 or 55, wherein the crowd-sourced data comprises at least data generated by one or more users of a social network, data generated by one or more users of a web service, data published in a web blog, or data published on an online news website.

Conclusion

Examples of scheduling systems and associated components and methods have been described with reference to the figures. The figures show various systems and modules and connections between them. The various modules and systems can be combined in various configurations and connections between the various modules and systems can represent physical or logical links. The representations in the figures have been presented to clearly illustrate the principles of how to produce desirable schedules in a relatively quick and efficient manner, and details regarding divisions of modules or systems have been provided for ease of description rather than attempting to delineate separate physical embodiments. Additionally, the representations in the figures have been presented to clearly illustrate the principles of analyzing crowd-sourced data to produce desirable schedules in a relatively quick and efficient manner, and details regarding divisions of modules or systems have been provided for ease of description rather than attempting to delineate separate physical embodiments. The examples and figures are intended to illustrate and not to limit the scope of the inventions described herein. For example, the principles herein may be applied to a constellation of satellites wherein satellites include communication satellites, imaging satellites, Earth observation satellites, navigational satellites, weather satellites, or other types of satellites. The satellites can be any of a variety of sizes such as large satellites, medium satellites, mini-satellites, micro-satellites, nano-satellites, pico-satellites, and the like. The principles disclosed herein may be applied to systems that do not comprise a constellation of imaging satellites such as, e.g., air traffic control systems, vehicle routing systems, and so forth.

Although certain preferred embodiments and examples are disclosed herein, inventive subject matter extends beyond the specifically disclosed embodiments to other alternative embodiments and/or uses, and to modifications and equivalents thereof. Thus, the scope of the claims appended hereto is not limited by any of the particular embodiments described herein. For example, in any method or process disclosed herein, the acts or operations of the method or process can be performed in any suitable sequence and are not necessarily limited to any particular disclosed sequence. Various operations can be described as multiple discrete operations in turn, in a manner that can be helpful in understanding certain embodiments; however, the order of description should not be construed to imply that these operations are order dependent. Additionally, the structures described herein can be embodied as integrated components or as separate components. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein.

Each of the processes, methods, and algorithms described herein and/or depicted in the attached figures (including FIGS. 5, 7, 11, and 12) may be embodied in, and fully or partially automated by, code modules executed by one or more physical computing systems, computer processors, application-specific circuitry, and/or electronic hardware configured to execute computer instructions. For example, computing systems can include general or special purpose computers, servers, desktop computers, laptop or notebook computers or tablets, personal mobile computing devices, mobile telephones, and so forth. A code module may be compiled and linked into an executable program, installed in a dynamic link library, or may be written in an interpreted programming language.

Various embodiments have been described in terms of the functionality of such embodiments in view of the general interchangeability of hardware and software. Whether such functionality is implemented in application-specific hardware or circuitry or in software executing on one or more physical computing devices depends upon the particular application and design constraints imposed on the overall system. Further, certain implementations of the functionality of the present disclosure are sufficiently mathematically, computationally, or technically complex that application-specific hardware or one or more physical computing devices (utilizing appropriate executable instructions) may be necessary to perform the functionality, for example, due to the volume or complexity of the calculations involved or to provide results substantially in real-time.

Code modules may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes and process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer or software product or packaged into multiple computer or software products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network (e.g., a terrestrial and/or satellite network) or any other type of communication network.

The various elements, features and processes described herein may be used independently of one another, or may be combined in various ways. All possible combinations and subcombinations are intended to fall within the scope of this disclosure. Further, nothing in the foregoing description is intended to imply that any particular feature, element, component, characteristic, step, module, method, process, task, or block is necessary or indispensable. The example systems and components described herein may be configured differently than described. For example, elements or components may be added to, removed from, or rearranged compared to the disclosed examples.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" or "an" as used in this application and the appended claims are to be construed to mean "one or more" or "at least one" unless specified otherwise.

As used herein, the terms "comprises," "comprising," "includes," "including," "has," "having" or any other variation thereof, are open-ended terms and intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

The foregoing disclosure, for purpose of explanation, has been described with reference to specific embodiments, applications, and use cases. However, the illustrative discussions herein are not intended to be exhaustive or to limit the inventions to the precise forms disclosed. Many modifications and variations are possible in view of the above teachings. The embodiments were chosen and described in order to explain the principles of the inventions and their practical applications, to thereby enable others skilled in the art to utilize the inventions and various embodiments with various modifications as are suited to the particular use contemplated.

What is claimed is:

1. A system for scheduling events for a plurality of satellites, the system comprising:
 a computing device configured to execute:
  an event system configured to produce, store, or receive event requests;
  a constraints system configured to produce, store, or receive characteristics of the plurality of satellites;
  a prioritization system configured to produce, store, or receive priority information corresponding to the event requests; and a control system operatively coupled to the event system, the constraints system, and the prioritization system, the control system comprising:
  a scheduling module configured to process the event requests received from the event system, the characteristics of the plurality of satellites received from the constraints system, and the priority information received from the prioritization system and to produce a near-optimal schedule of events in near real-time that does not violate constraints of the plurality of satellites; and
  a command module configured to receive the near-optimal schedule of events and create control instructions for the plurality of satellites based at least in part on the near-optimal schedule of events.

2. The system of claim 1, wherein the scheduling module is configured to use a directed acyclic graph to produce the near-optimal schedule of events.

3. The system of claim 2, wherein at least one event is such that all acceptable paths through the directed acyclic graph pass through the event.

4. The system of claim 1, wherein the characteristics of the plurality of satellites include pair-wise constraints and cumulative constraints.

5. The system of claim 4, wherein the cumulative constraints include one of a data capacity limitation, a power requirement, or a thermal value.

6. The system of claim 4, wherein the pair-wise constraints include a slewing rate of a satellite.

7. The system of claim 1, wherein the scheduling module is configured to produce the near-optimal schedule of events by building a sequence of events and removing a newly added event if a utilization function does not increase.

8. The system of claim 1, wherein the scheduling module is produce the near-optimal schedule of events by building a sequence of events and removing a newly added event if a cumulative constraint would be violated by maintaining the newly added event in the near-optimal schedule of events.

9. The system of claim 1, wherein the event system is further configured to produce an event based on crowd-sourced data.

10. The system of claim 1, wherein the plurality of satellites comprises micro-satellites.

11. Non-transitory computer storage configured with executable instructions for scheduling events for a plurality of satellites, the executable instructions comprising:
  a scheduling module configured to produce a near-optimal schedule of events in near real-time by building a temporary schedule of events one event at a time and removing a newly added event from the temporary schedule if it causes a violation of a cumulative constraint; and
  a command module configured to receive the near-optimal schedule of events and create control instructions for the plurality of satellites based at least in part on the near-optimal schedule of events,
  wherein the near-optimal schedule of events is the temporary schedule of events which does not violate of a cumulative constraint.

12. The non-transitory computer storage of claim 11, wherein the near-optimal schedule of events is the temporary schedule of events which results in a higher value for a utilization function than other temporary schedules of events.

13. The non-transitory computer storage of claim 11, wherein the scheduling module is configured to build the temporary schedule of events by starting with a first event and adding a second event later in time than the first event, wherein the second event is not pair-wise constrained from following the first event in the temporary schedule.

14. The non-transitory computer storage of claim 11, wherein the satellite comprises an imaging satellite, and the scheduling module is further configured to:
  analyze crowd-sourced data to determine an event of interest;
  determine a geographic location for the event of interest using the crowd-sourced data; and
  create an image acquisition request comprising the determined geographic location of the event of interest.

15. The non-transitory computer storage of claim 11, further comprising a display module configured to display the near-optimal schedule of events.

16. A method for scheduling events for a plurality of objects, the method comprising:
  under control of a computing device in communication with non-transitory data storage configured to store properties corresponding to characteristics of the plurality of objects:
    determining a likely path for each of the plurality of objects;
    receiving event requests and object properties for the plurality of objects;
    producing a near-optimal schedule of events that does not violate constraints of the plurality of objects; and
    converting the near-optimal schedule of events to control instructions for transmission to the plurality of objects,
  wherein a first constraint of the plurality of objects is a cumulative constraint and a second constraint of the plurality of objects is a pair-wise constraint.

17. The method of claim 16, wherein producing the near-optimal schedule of events comprises utilizing a directed acyclic graph to determine the near-optimal schedule of events.

18. The method of claim 16, wherein at least some of the plurality of objects comprise imaging satellites, and the cumulative constraint is one of a data capacity limitation, a power requirement, or a thermal value.

19. The method of claim 16, wherein at least some of the plurality of objects comprise imaging satellites, and the pair-wise constraint is a slewing rate of one of the imaging satellites.

20. The method of claim 16, wherein at least some of the plurality of objects comprise a constellation of imaging satellites, and the method further comprises:
  accessing crowd-sourced data;
  analyzing the crowd-sourced data to determine an event of interest;
  determining a geographic location for the event of interest using the crowd-sourced data;
  determining a degree of relevance for the event of interest;
  creating an image acquisition request, wherein the image acquisition request comprises the determined geographic location of the event of interest; and
  including the image acquisition request in the schedule of events.

21. The method of claim 16, wherein the method produces the near-optimal schedule of events in near real-time.

22. The method of claim 21, wherein the method produces the near-optimal schedule of events in less than about 10 minutes.

23. The method of claim 16, wherein at least some of the plurality of objects comprise satellites.

* * * * *